United States Patent [19]
Kara

[11] Patent Number: 5,812,991
[45] Date of Patent: Sep. 22, 1998

[54] SYSTEM AND METHOD FOR RETRIEVING POSTAGE CREDIT CONTAINED WITHIN A PORTABLE MEMORY OVER A COMPUTER NETWORK

[75] Inventor: Salim G. Kara, Houston, Tex.

[73] Assignee: E-Stamp Corporation, Houston, Tex.

[21] Appl. No.: 727,833

[22] Filed: Oct. 2, 1996

Related U.S. Application Data

[63] Continuation-in-part of Ser. No. 515,988, Aug. 16, 1995, which is a continuation-in-part of Ser. No. 263,751, Jun. 22, 1994, Pat. No. 5,606,507, which is a continuation-in-part of Ser. No. 176,716, Jan. 3, 1994, Pat. No. 5,510,992.

[51] Int. Cl.[6] .................................................. G07B 17/00
[52] U.S. Cl. .................... 705/410; 235/375; 340/825.35; 705/410
[58] Field of Search ...................... 235/375, 380, 235/381; 364/464.11, 464.13, 464.14, 464.16, 464.18, 464.2; 340/825.31, 825.33, 825.34, 825.35; 705/401, 403, 404, 406, 408, 410

[56] References Cited

U.S. PATENT DOCUMENTS

| | | | |
|---|---|---|---|
| 4,253,158 | 2/1981 | McFiggans | 380/23 |
| 4,376,299 | 3/1983 | Rivest | 380/23 |
| 4,641,347 | 2/1987 | Clark et al. | 380/3 |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 380/51 |
| 4,763,271 | 8/1988 | Field | 364/466 |
| 4,775,246 | 10/1988 | Edelmann et al. | 380/23 |
| 4,800,506 | 1/1989 | Axelrod et al. | 364/478 |
| 4,802,218 | 1/1989 | Wright et al. | 380/23 |
| 4,812,994 | 3/1989 | Taylor et al. | 364/464.02 |
| 4,831,554 | 5/1989 | Storace et al. | 364/464.13 |
| 4,831,555 | 5/1989 | Sansone et al. | 364/519 |
| 4,837,701 | 6/1989 | Sansone et al. | 364/464.14 |
| 4,858,138 | 8/1989 | Talmadge | 364/464.18 |
| 4,864,618 | 9/1989 | Wright et al. | 380/51 |
| 4,868,757 | 9/1989 | Gil | 364/464.03 |
| 4,900,903 | 2/1990 | Wright et al. | 235/380 |
| 4,900,904 | 2/1990 | Wright et al. | 235/381 |
| 4,901,241 | 2/1990 | Schneck | 364/464.02 |
| 4,908,770 | 3/1990 | Breault et al. | 364/464.14 |
| 4,941,091 | 7/1990 | Breault et al. | 395/230 |
| 5,065,000 | 11/1991 | Pusic | 235/381 |
| 5,111,030 | 5/1992 | Brasington et al. | 235/375 |
| 5,202,834 | 4/1993 | Gilham | 364/464.14 |
| 5,224,046 | 6/1993 | Kim et al. | 364/464 |
| 5,239,168 | 8/1993 | Durst, Jr. et al. | 235/432 |
| 5,319,562 | 6/1994 | Whitehouse | 364/464 |
| 5,583,779 | 12/1996 | Naclerio et al. | 364/464.18 |
| 5,606,613 | 2/1997 | Lee et al. | 380/21 |

FOREIGN PATENT DOCUMENTS

| | | |
|---|---|---|
| 0137737 | 9/1984 | European Pat. Off. |
| 2580844 | 4/1986 | France |
| 2251210 | 12/1990 | United Kingdom |
| 8801818 | 3/1988 | WIPO |

*Primary Examiner*—Edward R. Cosimano
*Attorney, Agent, or Firm*—Fulbright & Jaworski L.L.P.

[57] ABSTRACT

A system and method for printing postage indicia, including a desired postage amount, onto a piece of mail. A user takes a postal dispensing device to, or establishes information communication with, an authorized agent of a postal authority in order to obtain a replenishment of the amount of postage stored within the portable postage dispensing device. A desired amount of postage is entered into the dispensing device by an authorized agent through a host processor-based system. The user is then able to access this stored postage at the user's location through a network of processor-based systems. By using the network of processor-based systems the user is able to couple the portable dispensing device to a first processor-based system and then allow distribution of postage amounts to multiple ones of the networked processor-based systems. These ones of the networked processor-based systems may then print an authorized postage indicia on a postal item.

92 Claims, 21 Drawing Sheets

Post N Mail, Inc.
505 Cypress Station Dr. Suite # 505    Telephone (713)583-8909  Fax (713)699-0101
Houston, Tx 77030-1612

"E-Stamp"™ - Registration form

31 — T.M.U. Button Serial  #000000001          Date: April 20, 1994  ⎫
32 — E-Stamp Serial        #000000001          Time: 01:29 AM        ⎬ 33
                                                                     ⎭

35 ⎰ Registered user:
   ⎪ Individual      Salim G. Kara            Social Security # 636-18-0137
   ⎨ Organization    Global Impex, Inc.       Employer I.N. # 76-0422781
   ⎪ Address:        505 Cypress Station Dr.
   ⎪                 Suite #505
   ⎪ City:           Houston        State: Tx    Zipcode+4: 77090-1612
   ⎩ Telephone: (713)583-8909    Fax: (713)699-0101

Post N Mail License Agreement

36 ⎰ This is a legal agreement between you (an individual or an entity), the end user, and
   ⎪ Post N Mail, Inc. If you do not agree to the terms of this Agreement, promptly return
   ⎪ the disk package and accompanying items (including all hardware, written materials and
   ⎪ binders or other containers) to the place you obtained them for a full refund.
   ⎨ License
   ⎪ 1. Grant of License.
   ⎪ 2. Term of License.
   ⎪ 3. Copyright.
   ⎪ 4. Other restrictions.
   ⎪ 5. Limited warranty.
   ⎪ 6. Customer remedies.
   ⎪ 7. No Other Warranties.
   ⎩ 8. No Liability for Consequential Damages.

_____ 308
Signature

FIG. 3A

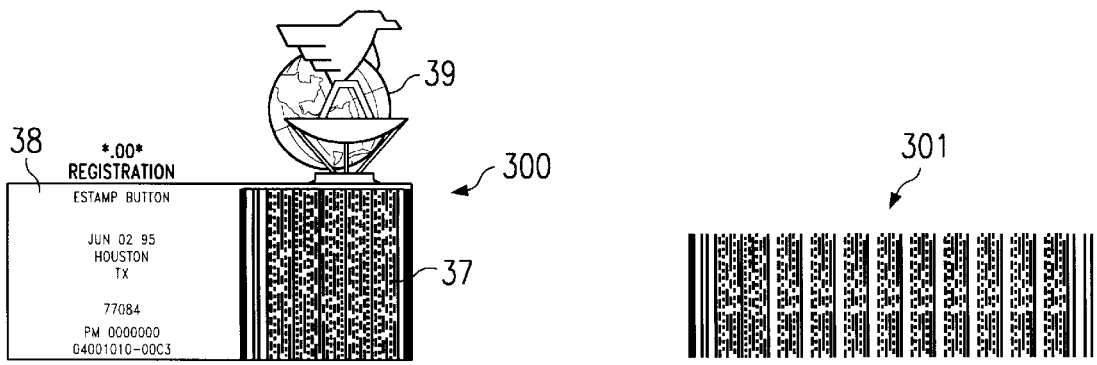

BLOCK DIAGRAM OF MEMORY LAYOUT FOR PREFERRED
EMBODIMENT OF PORTABLE POSTAGE PROCESSOR

---

3k BYTES NON-VOLATILE STATIC RAM

| | |
|---|---|
| CREATION DATE/TIME | CURRENT BALANCE |
| CREATING AGENT ID | STRIKE COUNTER |
| BUTTON TYPE: (POSTAGE) | BALANCE BEFORE LAST REFILL |
| PASSWORD | LAST REFILL DATE |
| USER REGISTRATION ID | LAST REFILL AMOUNT |
| USER NAME | LAST REFILL AGENT ID |
| USER ADDRESS | LAST REFILL POSTAL LOCATION ID |
| USER STATE | LAST REFILL STATION NUMBER |
| USER ZIP | TRANSACTION LOG |
| USER PHONE | EVENT LOG |
| USER FAX | ENCRYPTION KEYS |

*FIG. 12*   1201

BLOCK DIAGRAM OF MEMORY LAYOUT FOR PREFERRED EMBODIMENT OF
PORTABLE SECURITY DEVICE PROCESSOR FOR AGENT AND MASTER

---

3k BYTES NON-VOLATILE STATIC RAM

| | |
|---|---|
| CREATION DATE/TIME | TRANSACTION LOG |
| CREATING MASTER ID | EVENT LOG |
| BUTTON TYPE: (AGNT OR MSTR) | ENCRYPTION KEYS |
| PASSWORD | |
| AGENT REGISTRATION ID | |
| AGENT NAME | |
| AGENT LOCATION ADDRESS | |
| AGENT STATE | |
| AGENT ZIP | |
| AGENT PHONE | |

*FIG. 13*   1301

SECURE METER PROCESS LOOP

SYSTEM AND METHOD FOR RETRIEVING POSTAGE CREDIT CONTAINED WITHIN A PORTABLE MEMORY OVER A COMPUTER NETWORK

REFERENCE TO RELATED APPLICATIONS

The present application is a continuation-in-part of U.S. application Ser. No. 08/515,988, filed Aug. 16, 1995, and entitled "SYSTEM AND METHOD FOR CONTROLLING THE STORAGE OF DATA WITHIN A PORTABLE MEMORY," which in turn is a continuation-in-part of U.S. application Ser. No. 08/263,751, filed Jun. 22, 1994, and entitled "SYSTEM AND METHOD FOR STORING, RETRIEVING AND AUTOMATICALLY PRINTING POSTAGE ON MAIL," which issued as U.S. Pat. No. 5,606,507 on Feb. 25, 1997, which in turn is a continuation-in-part of U.S. application Ser. No. 08/176,716, filed Jan. 03, 1994, and entitled "SYSTEM AND METHOD FOR AUTOMATICALLY PRINTING POSTAGE ON MAIL," which issued as U.S. Pat. No. 5,510,992 on Apr. 23, 1996.

TECHNICAL FIELD OF THE INVENTION

This invention relates in general to a portable postage storage device that can be coupled to processor-based systems to receive and retrieve an amount of authorized postage and to enable the printing of an authenticating indicia. More particularly, the invention relates to a system and method whereby a first processor-based system retrieves postage credit contained within a portable postage storage device coupled to a second processor-based system.

BACKGROUND OF THE INVENTION

Presently, it is common for individuals or businesses to have residing within their offices a postage meter rented from a commercial business. This arrangement is very convenient, since letters may be addressed, postage applied, and mailed directly from the office without requiring an employee to physically visit the U.S. Post Office and wait in line in order to apply postage to what is often a quite significant volume of outgoing mail, or to manually apply stamps to each piece of mail.

Quite naturally, postage meters were developed to relieve the manual application of stamps on mail and to automate the above process. Nevertheless, a postage meter residing within an office is not as convenient and efficient as it may first seem to be. First, a postage meter may not be purchased, but must be rented. The rental fees alone are typically over twenty dollars per month. For a small business, this can be quite an expense to incur year after year Second, a postage meter must be adjusted, serviced and replenished manually; e.g., each day the date must be adjusted manually, periodically the stamp pad must be re-inked, and when the amount of postage programmed within the postage meter has expired, the postage in the meter must be replenished. To be replenished, a postage meter must be manually unplugged, placed into a special case (the meter is of a significant weight), and an employee must visit a U.S. Post Office to have the meter reprogrammed with additional postage. Upon arrival at the U.S. Post Office, a teller must cut the seal, replenish the meter with a desired amount of postage, and reseal the meter before returning it to the employee. The meter must then be returned to the office and powered up.

A slightly more expensive meter (rental of approximately $30.00 more) works in the following manner: 1) a user sets up an account with the meter owner, 2) 7 to 10 days before a user requires more postage, the user deposits with the meter owner the amount of postage required, 3) the user then calls the owner (7 to 10 days later) and they issue instructions as to the manual pushing of a variety of buttons on the meter (programming) which will replenish the postage amount on the meter. Nonetheless, the meter must be taken to the Post Office every 6 months.

Thus, in addition to the monthly rent, the servicing and replenishing of the meter requires the time and expense of at least one employee to take the meter to the U.S. Post Office to have it replenished. Of course, this procedure results in down-time wherein the postage meter is not available to the business for the application of postage to outgoing mail. In addition, because of the monthly rent and the size of these devices, it is generally not practical for businesses to have more than one postage meter to alleviate this down-time. Lastly, there is nothing inherent in the postal meter system which inhibits fraud.

As previously mentioned, the alternative to a business, especially a small business, is to forego the advantages of a postage meter and to buy sheets, or books, of stamps. Without a doubt, this is not a sufficient solution. Since a variety of denominations of stamps are generally required, applying two 32¢ stamps to a letter requiring only 40¢, will begin to add up over time. Additionally, it is difficult for a business to keep track of stamp inventories and stamps are subject to pilferage and degeneration from faulty handling. Moreover, increases in the postal rate (which seem to occur every three years) and the requirement for variable amounts of postage for international mail, make the purchase of stamps even more inefficient and uneconomical.

Because of different postage zones, different classes of mail, different postage required by international mail and the inefficiency of maintaining stamps within an office, it is important to have an automatic postage system, such as the aforementioned inefficient and relatively expensive postage meter.

Accordingly, there is a need in the art for a system and method that provides the automatic placement of postage on mail at locations other than a U.S. Post Office, while not requiring the use of a traditional postage meter.

One major problem with any system in which a portable processor is used for controlling available values in a computer system, such as the amount of postage available to a user, is the maintenance of strict controls on the "filling" of the memory. Any such controls must have as a component the ability to create an audit trail and the ability to withstand unauthorized usage.

Another problem facing any CPU based system with a portable processor to store postage is that the system should optimally interface with a user friendly operating environment that is flexible and can be coupled to other programs such as a word processing or graphics program.

It is a primary object of this invention to provide a system and method to dispense postage in a secure manner so that it can be authenticated on a piece-by-piece basis.

It is a further object of this invention to provide a system and method which allows for the external authentication of printed indicia from information obtained from the material upon which the indicia has been attached.

Another object of the invention is to use a printed indicia based upon information contained in a portable processor which will provide management information via the indicia to the authenticating agency, such as a post office.

Another object of the invention is to provide a system and method whereby various configurations of postage indicia can be input into the portable memory device.

It is a further object of the invention to provide a system and method whereby the user can select from several configurations of postage indicia which the user desires to print on an item of mail.

It is a still further object of the invention to provide a system and method whereby a user can import personalized, or customized, postage indicia graphics into the interface program which allows a CPU to read a portable processor device.

It is a still further object of the invention to be secured from outside attempts at reverse engineering, not only for the protection of the portable processor as a trade secret but so that the integrity of credits it dispenses is never in doubt.

SUMMARY OF THE INVENTION

These and other objects and advantages are present wherein a portable device is constructed with a memory and having a processor controlling that memory. The device is arranged to communicate with a CPU, such as operable in a general purpose computer or PC, in order to exchange data and instructions therewith.

The portable processor device has on board certain security related fields, such as the date and time, the balance, random number generators, a private cryptographic key number of transactions that have taken place on the device, and the serial number of the device. It may also have on board when the user initializes the device, information about the owner of the device including his/her name, the registration number and other information about the owner such as the user's address and password.

When the device is used and a transaction is about to be debited from the device, the information about the transaction, such as the debit amount and other transaction information that is postage related, such as the addressee's ZIP code, the addressor's ZIP code, the recipient's address and name, the mail class, etc. These are all uploaded to the device from the PC. The processor stores them in memory, then it takes all of these packets of information, the security information, the owner information, date and time and the transaction information, and encrypts them into a packet, using its own key which is on board the device (it is not given externally). Once the debit has taken place, the device gives data back to the PC in encrypted form. The PC then takes that information and packages it into an indicia in the form of a portable data file so that the encrypted information can then be authenticated by the authenticating agency after it has been delivered along with a document. If the object is not to print the indicia but to authenticate a transaction that is being transmitted electronically, then the packet is used for verification of the electronic data. Typically, the verification occurs at a point remote from any connection to the PC or to the PC user.

Although the portable processor device of the present invention may be coupled directly to a PC with which it is communicating, a preferred embodiment provides an information link for communication between the device and a PC without them being directly coupled. Thus, the device may be removably coupled to a node on a local area network (LAN) which provides information communication between the device and at least one PC.

In yet another preferred embodiment of the present invention, the display screen coupled to the processor-based system employs a windows type graphical user interface for interfacing with the user. Through the display screen, the program will request a password from the user and the amount of postage the user wishes to apply to a piece of outgoing mail or corresponding label for subsequent application to a package or envelope. The user will enter the desired amount of postage; the program will retrieve this postage stored within the portable processor, and the E-STAMP program will print postage indicia through a coupled printing device onto the outgoing mail or label.

In still another preferred embodiment of the present invention, the program may be coupled to another process such as a word processing program, spreadsheet, graphic application, database, accounting package, or any other process residing within the processor-based system. As a result, the application of the postage indicia may be made in conjunction with these programs, which have the capability to print particular items of correspondence to be posted.

Furthermore, the system may also be programmed to print the address, return address and postage indicia on correspondence, invoices, statements, or other items. This correspondence can then be placed in envelopes with cutouts or glassing paper at the appropriate areas so that the address, return address and/or meter stamp can be visualized through the envelope.

In another preferred embodiment of the present invention, the aforementioned portable processors are specially manufactured by Dallas Semiconductor for use in conjunction with programs, i.e., unique serial numbers specific to the program are embedded within each portable processor button. These serial numbers are then recorded in a user registration database for use by the Post Office and their associated scanning software, hereinafter referred to as "POSTAGESCAN™" software, to scan and verify letters. Thus, a form of security is provided since only the portable processors specially manufactured for use with the E-STAMP program are able to receive or retrieve data pertaining to postage amounts, as previously described.

Additionally, a special user-defined password shall be dedicated for use with the program so that access is only provided to users entering the correct password. The aforementioned serial numbers and passwords may, in addition to protecting against unauthorized use, also allow a user and the Postal authority to track postage used by every company, department, employee, etc. Furthermore, other software programs may also be configured to access the control program so that spreadsheets and/or graphs may be produced providing statistics on postage use within a business.

Furthermore, the control program can be used to encode a variety of information within the postage indicia using bar code symbol technology. Such information would be machine readable and can be used to identify postal indicia forgeries, in combination with the established control database of active system users.

In an alternative embodiment of the present invention, the system is arranged to automatically calculate the correct postage to place on a letter, parcel or label as a function of the class, zone and weight of the particular item to be mailed. One embodiment of the present invention includes a balance coupled to the host processor-based system so that mail can be placed on the balance and the weight of the mail automatically entered into the system for calculating the correct postage for that mail.

When the portable processor memory is refilled, the recorded transaction information can be analyzed either from the perspective of management information or to try to detect fraud. This allows for authentication or verification at a point remote (both physically and electronically) from the user and remote from the PC and even remote from the portable processor.

It is one technical advantage of this invention that the most vital security related functions of the system are performed on board the portable processor so that it is not very easily tampered with.

It is another technical advantage of this invention that the portable postage devices are easily transported from one standard computer to another.

It is another technical advantage of this invention that the portable postage storage devices are durable, long lasting and economical. One method of accomplishing this is to use a portable processor with a hardened case, not allowing direct contact with the processor. In this way, the code which defines the personalizing of the processor remains secret and cannot be disassembled.

It is another feature of this invention to provide a system and method that as transactions take place the portable memory records certain information about each transaction and maintains a log of the most recent transactions.

In one embodiment, it is a technical advantage of the invention that it presents an entire system and method for dispensing postage electronically using a portable processor and refilling of the portable processor through the use of a secure credit server with the transformation of a combination of credits and information about the portable processor user into a graphical security interface, such as a printed postage indicia, entitling the user to obtain an official transaction at a point detached from both the processor and the user (such as the sending of a parcel in the mail system).

When the portable processor device and a PC with which it is communicating are not directly coupled, a technical advantage is achieved in that a plurality of PCs may then communicate with a single portable processor device. Furthermore, strict physical control over the portable processor device may be easily maintained while still providing access to a large number of users for the postage credit contained within the portable device. Moreover, such an environment provides a business the opportunity to make postage credits widely available to its employees while maintaining detailed records of the various transactions from a central location.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A illustrates one embodiment of a user registration form;

FIG. 3B illustrates a postal or verification indicia;

FIG. 3C illustrates an encoded user registration form;

FIGS. 8 and 8A illustrate a display interface provided to a user when accessing the present invention on a host processor-based system;

FIG. 12 illustrates how a postage button is encoded;

FIG. 13 illustrates how an agent or master button is encoded;

DETAILED DESCRIPTION OF THE INVENTION

Figure 1A:
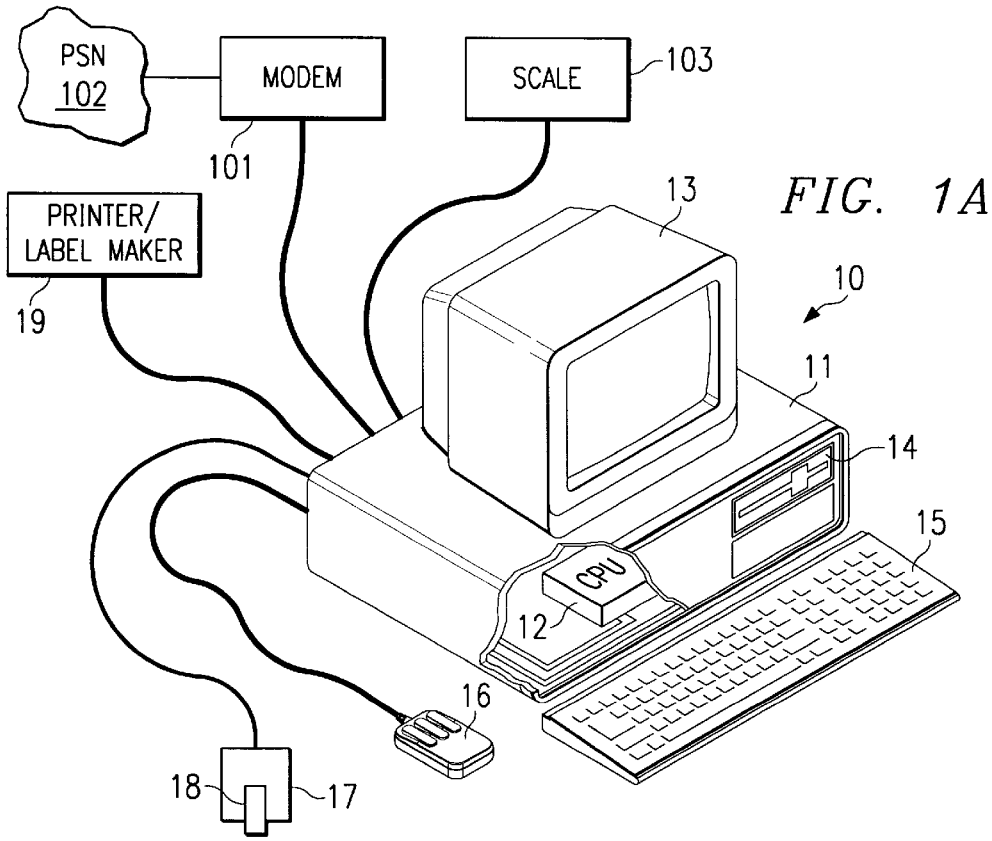
FIG. 1A illustrates a host processor-based system for implementation of the present invention.

The present invention provides for a portable postage dispensing device, described in more detail below, that can be coupled to a host processor-based system at both the customer's site and at the postal authority or an authorized agent. Throughout the remainder of this description, reference is made to the U.S. Post Office, postal authority or its agents. Note, however, that the present invention may be implemented within any country and with respect to any postal system or with respect to any data packet which is being examined by a validating authority detached, both physically and electronically, from its source.

The present invention will allow an individual to purchase a desired amount of postage at an authorized agent of the U.S. Post Office, such postage being stored within a portable postage dispensing device, which itself is a portable processor. The user may then invoke a host processor-based system to access and retrieve a portion of the stored amount of postage via a program stored on the host processor-based system, such program hereinafter referred to as the "E-STAMP" program. The E-STAMP program requests input from the user on the weight of the item to be mailed, the addressee's address, etc. The E-STAMP program utilizes the information that was entered to calculate the amount of desired postage for an item to be mailed and prints a meter stamp indicia on an envelope, label or letter through a printer or special purpose label maker coupled to the host processor-based system.

In a preferred embodiment, wherein the portable processor device is not directly coupled with a client processor-based system with which it is communicating, the device is coupled to a host processor-based system. The client system and the host system are in information communication through a network, such as, by way of example, a local area network (LAN). To enable information communication between the portable processor device and the client system, the E-STAMP program is divided into two modules, hereinafter the "E-STAMP SERVER" and "E-STAMP CLIENT" modules. These E-STAMP SERVER and E-STAMP CLIENT modules include programs suitable for execution on processor-based systems. In this discussion, the term "E-STAMP program" collectively refers to the E-STAMP SERVER and E-STAMP CLIENT modules and their programs.

The E-STAMP CLIENT program is stored on the client system and provides control for such functions as the entry of data, requesting postage from the E-STAMP SERVER program, and printing of the postage indicia. The E-STAMP SERVER program is stored on the host system and provides control for such functions as queuing and servicing postage requests from a plurality of client systems, demanding a portion of the stored amount of postage from the device, and logging detailed information regarding postage requests.

Alternatively, the E-STAMP program may not be divided into two modules to be stored on the client and host systems. In this alternative, the host system may simply be a network node capable of emulating an input/output (I/O) port of the host system. In a preferred embodiment, the network node is a NETSERIAL device manufactured by Shiva Corporation, Burlington, Mass. Information communication between the portable processor device and the client system is accomplished by a terminate and stay resident (TSR) program supplied by the manufacturer of the network node. Such a TSR program causes the E-STAMP program's request to access the device through a local I/O port to be redirected through a LAN to the host system. It also operates to mediate concurrent requests to use the same networked portable processor, causing one client to wait until the portable processor is available.

In yet another embodiment, the E-STAMP SERVER program controls printing of postage indicia in the amount requested by the E-STAMP CLIENT program. Such an embodiment not only provides a centralized supply of postage credit, but also provides the ability to print the postage indicia on a centralized printer or printers. An advantage to such a system is the ability to more economically utilize expensive equipment. Furthermore, an advantage is achieved in the ability to maintain a printing device constantly in a state ready for printing postage indicia by such means as being constantly loaded with the proper media upon which to print postage indicia. A further advantage of such an embodiment is that the communication of postage credit between the E-STAMP SERVER program and E-STAMP CLIENT program may be omitted if desired.

It shall be understood that communication of postage credit between the portable processor device and the client system may be in the form of a data representation of the postage indicia to be printed or data representative of a particular value from the portable processor. In a preferred embodiment, data representation of the postage indicia to be printed is utilized to increase the integrity of the system by avoiding the distribution of postage indicia generation capability to multiple systems. In another embodiment, data representative of a particular value from the portable processor is utilized to decrease the volume of information communication necessary over the communication link.

The portable postage dispensing device can also be coupled to a host processor-based system located at the authorized U.S. Post Office Agent. Particular post office sites and authorized agents will have installed a system complementary to the software system installed on the customer's PC. The program installed at the U.S. Post Office, hereinafter referred to as the "POSTAGEMAKER™" will allow an authorized agent to interface the portable postage dispensing device with the host processor-based system residing at the authorized refilling agent in order to replenish the amount of postage programmed within the portable postage dispensing device in an amount requested and purchased by the customer.

In an alternative embodiment the POSTAGEMAKER program operates to allow the authorized refilling of the portable postage device remotely, such as, for example, through a public switched network (PSN) or LAN. In this embodiment the POSTAGEMAKER program operates in conjunction with the E-STAMP program to replenish the amount of postage programmed within the postage device without the need for physically coupling the portable postage device directly to a postal authority host processor. For example, the E-STAMP program may initiate communications with the POSTAGEMAKER program through the use of modems and telecommunications lines as is well known in the art. Such communications may be initiated automatically upon the occurrence of a condition or event or may be initiated at the request of an operator. Upon establishing communications, the E-STAMP program may request an amount of postage to be replenished and indicate payment by such means as a valid bank card or a debit account maintained with the postal authority.

Of course any number of refill request authentication means may be included within the POSTAGEMAKER and E-STAMP programs, such as verification of unique information associated with the E-STAMP program and/or associated portable postal device, to detect fraudulent requests for postal credit, if desired. Furthermore, the POSTAGEMAKER program may request certain information of the postage storage device in order to detect tampering with the device. Such information may include total strike count, balance of various registers, or date of last refill. This information may be analyzed or compared with information available at the postal authority to detect unauthorized use or refilling of a postal storage device. Detection of improper usage of the postal storage device will result in refusal to transmit a replenishing amount of postage from the POSTAGEMAKER program to the E-STAMP program. Additionally, the E-STAMP program may cause the postal storage device to become inoperable upon instruction from the POSTAGEMAKER program.

Figure 1B:
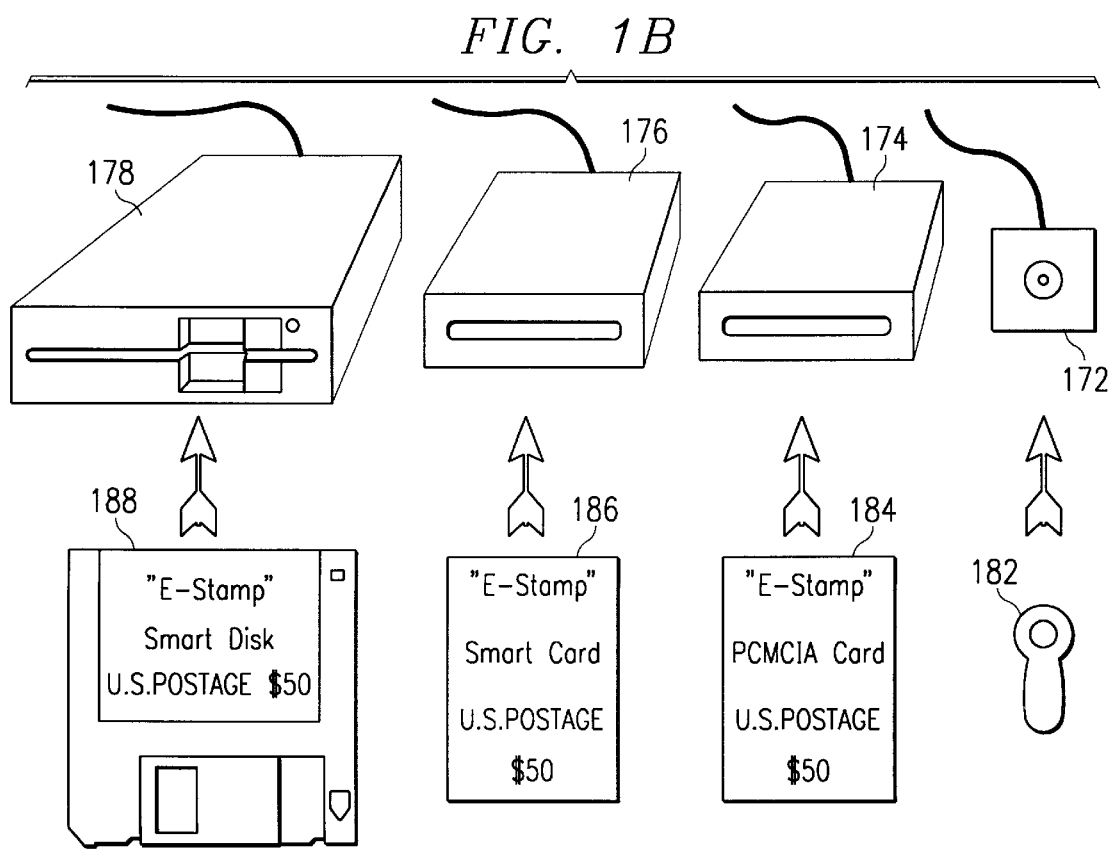
FIG. 1B illustrates several embodiments of the postage storage device.
Figure 1C:
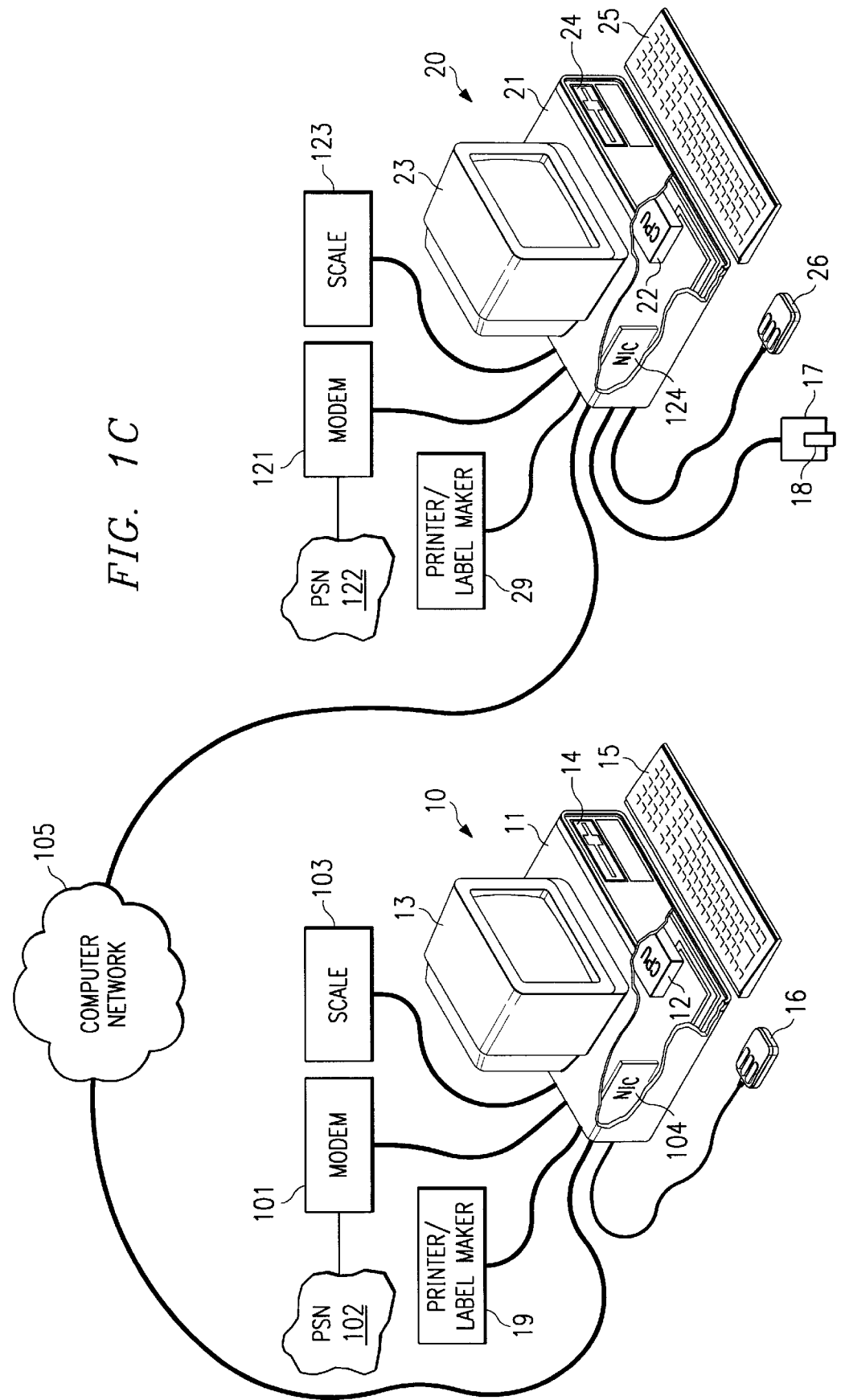
FIG. 1C illustrates a computer network system for implementation of the present invention utilizing a client processor-based system in combination with a host processor-based system interconnected via a local area network.

FIG. 1C, illustrates a computer network system for implementation of the present invention. This multiple processor system includes a client processor-based system 10 and a host processor-based system 20. In a preferred embodiment, system 10 is utilized for implementing the aforementioned E-STAMP CLIENT program while system 20 is utilized for implementing the aforementioned E-STAMP SERVER program.

System 10 includes chassis 11 enclosing processor (CPU) 12 and disk drive 14. Coupled to CPU 12 is display 13, keyboard 15, mouse 16, and network interface card (NIC) 104. System 10 is coupled to computer network 105 through NIC 104. Furthermore, system 10 is adapted for information communication with postage storage device 18 through computer network 105 and system 20. System 10 also includes modem 101 for communication through PSN 102, printer/label maker 19 and scale 103.

System 20 includes chassis 21 enclosing CPU 22 and disk drive 24. Coupled to CPU 22 is display 23, keyboard 25, mouse 26, and NIC 124. System 20 is coupled to computer network 105 through NIC 124. System 20 also includes modem 121 for communication through PSN 122, printer/label maker 29 and scale 123. Additionally, system 20 is adapted for coupling with postage storage device 18, such as the preferred embodiment portable processor button 182 illustrated in FIG. 1B and shown in block diagram form in FIG. 11. Postage storage device 18 is coupled to processor-based system 20 through a postage storage device receptor 17.

It shall be appreciated that modems 101 and 121, printer/label makers 19 and 29, and scales 103 and 123 may be omitted from either or both of systems 10 and 20. However it shall be understood that such devices may be advantageous, for example, to accomplish features such as remote refilling of postage credit, centralized or distributed printing of postage indicia, or automatic determination of postage required for a postal item.

An advantage to the utilization of systems 10 and 20 in combination with computer network 105 is that multiple ones of system 10 may utilize postage storage device 18. In a typical configuration, for example, many clients, each utilizing individual systems 10 and E-STAMP CLIENT programs, will be able to request postage from a single postage storage device 18 in combination with a single occurrence of the E-STAMP SERVER program. In such a configuration, the E-STAMP SERVER program provides centralized logistical control, such as queuing and servicing requests by ones of system 10. An added security advantage may be realized by this configuration in that the E-STAMP SERVER program may be utilized to generate a data representation of the postage indicia ultimately to be printed, and thus avoid multiple occurrences of this ability. Moreover, by utilizing the E-STAMP SERVER program at system 20, detailed records of postage requests and transactions may be maintained. In the preferred embodiment, the E-STAMP SERVER program records detailed transaction information on disk drive 24.

Figure 1D:
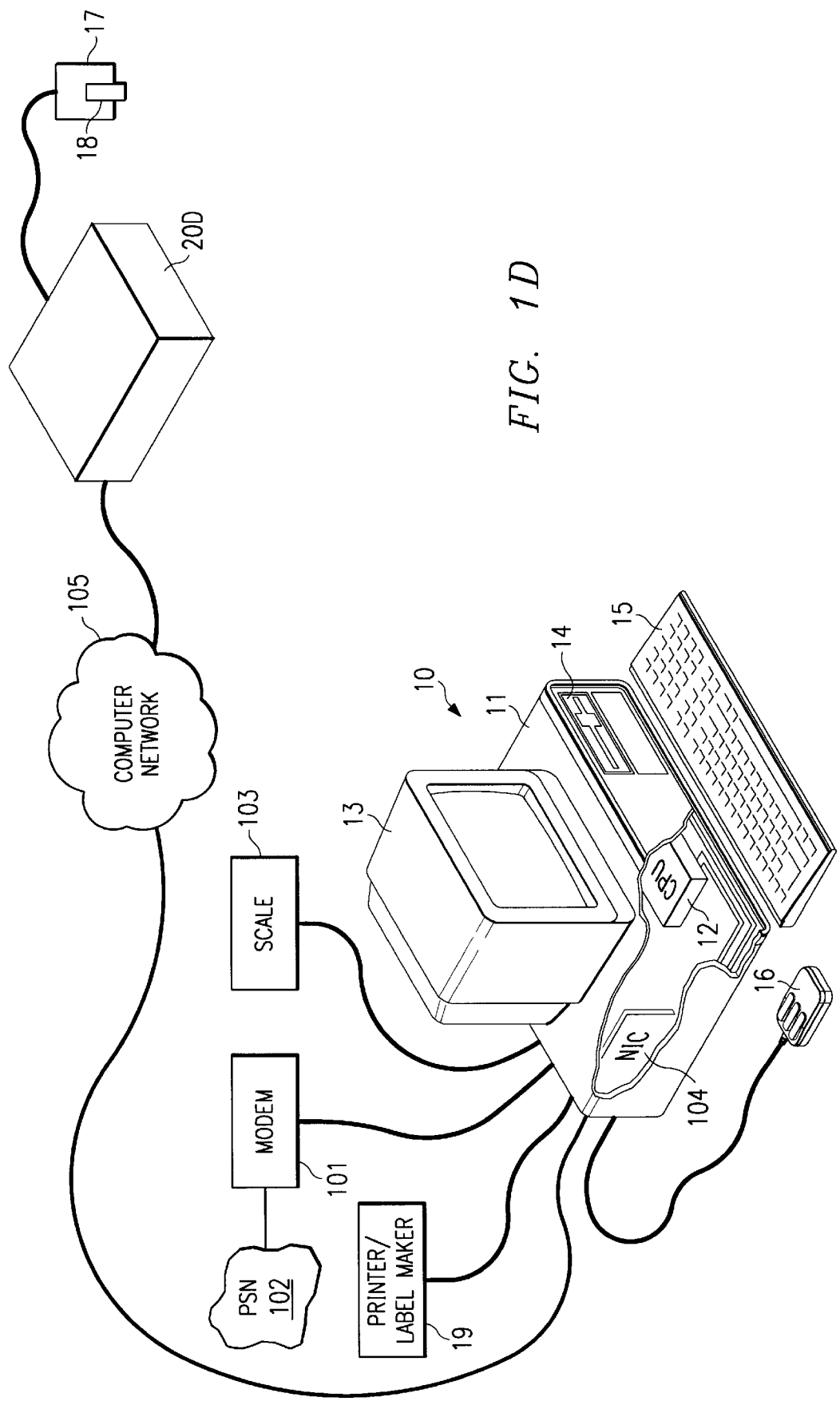
FIG. 1D illustrates a computer network system for implementation of the present invention utilizing a first processor-based host and an alternative embodiment of a second processor-based system interconnected via a local area network.

FIG. 1D illustrates a client processor-based system 10 and an alternative embodiment of the host processor-based system 20, of FIG. 1C, depicted here as system 20D. System 20D is a dedicated purpose network node device. System 10 is utilized for implementing the aforementioned E-STAMP program while system 20D is utilized for emulating an I/O port of system 10. This emulation is accomplished in part by a TSR program stored on system 10 that redirects information from an I/O port within system 10 to system 20D. Such I/O port emulation is well known in the art and may be accomplished by any number of commercially available means such as the preferred embodiment utilizing the NET-SERIAL device by Shiva Corporation, Burlington, Mass.

An advantage to utilizing I/O port emulation is that both the physical size and expense of a dedicated use network node device capable of I/O port emulation are typically less than a complete PC system. However, utilizing a commercially available network node device, while typically inexpensive and simple to implement, forgoes the advantage of utilizing the centralized E-STAMP SERVER program to maintain detailed records of postage requests. Such a limitation is a result of the dedicated use network node device typically being incapable of executing a program other than an internal network communication algorithm. However, where such a device is capable of execution of the E-STAMP SERVER program, the advantages of the centralized E-STAMP SERVER program may be realized. Furthermore, if desired, a single occurrence of the E-STAMP SERVER program may be executed on a system (not shown) other than system 20 and, through network communication with systems 10 and 20, provide the same advantages of the E-STAMP SERVER program running on system 20.

Although both the aforementioned E-STAMP and POSTAGEMAKER programs may be implemented on the embodiments illustrated in FIGS. 1C and 1D, a preferred embodiment utilizes a single processor-based system to implement POSTAGEMAKER. Referring to FIG. 1A, there is illustrated processor-based system 10 utilized for implementing the POSTAGEMAKER program. Postage storage device 18 is coupled to system 10 through a postage storage device receptor 17 coupled directly to system 10.

The portable postage dispensing device may be any securable, intelligent device having some residual data capability, where that device can provide sufficient security measures to efficiently limit access to the memory and executable code of the device to authorized users. Intelligence is defined as having a CPU or other processor and memory built into the portable processor device.

The preferred embodiment, portable processor button 182, incorporates a small disk having a memory and CPU. Portable processor button 182 is a small, light-weight, portable, essentially non-breakable device available as a touch memory utility button (TMU) from Dallas Semiconductor, Dallas, Tex. A portable processor button may be coupled to many processor-based systems, including those illustrated herein as systems 10, 20 and 20D, through button holder 172. In a preferred embodiment of the present invention, a batch of buttons will be manufactured with specifically designated serial numbers for use solely with the present invention. However, disposable portable processor buttons 182, preloaded in various denominations, could also be sold either over the counter or in existing stamp machines at post office locations. The postal authority may also select to sell pre-loaded portable processors, on which the customer pays a deposit, that can be exchanged for another portable processor or returned for the deposit whenever button 182 is depleted of postage. All authorized postal agent locations may sell pre-loaded portable processors or the postal authority may elect to designate particular postal authority locations for selling portable processors.

An advantage of the preferred embodiment (the portable processor button 182) is that a portable processor button 182 is small enough and light enough that several may be carried in one hand. Furthermore, the portable processor button 182 is sufficiently durable to be sent through the mail. The fact that the portable processor is universally usable with PC's allows the per unit cost to be lower. However, it shall be understood that the use of a secured data file stored on a hard disk drive, or any other suitable electronic memory, coupled to a processor based system may be utilized in the present invention.

Additional alternative embodiments of the portable postage dispensing device 18 are illustrated in FIG. 1B. One alternative postage storage device 18 is a smart disk 188 incorporating its own electronic modules capable of read/write operations. One embodiment of such a smart disk 188, SMART DISK™, can be obtained from Smart Disk Security Corporation, Naples, Fla. The smart disks™ looks like a floppy disk and fits into a typical PC's floppy disk drive, such as disk drive 178 connected either externally or internally to host processor-based system 10; however, smart disk™ has its own microprocessor that provides secure, password protected storage. One advantage of the smart disk™ is that it can operate in a standard PC disk drive without modification to the disk drive or PC. Smart disk™ provides security for stored postage with an encrypted password and the encryption algorithm.

Another type of portable postage dispensing device 18 is a smart card 186, a plastic card with an embedded microchip. The microchip contains mathematical formulas that encrypt computer data to secure access to that data (i.e., postage) and verify a user's identity before allowing access to the data. One drawback in the currently available smart cards 186 is that they require a smart card processor 176 hooked to the processor-based system 10.

Still another type of postage storage device 18 is a PCMCIA card 184. PCMCIA cards are currently used on notebook computers for modular storage and communication. Both external and internal add-on readers 174 (i.e., card slots) are available for PCs.

Postal storage device 18 may be used on a variety of processor-based systems 10 and/or 20 in a variety of configurations. Processor-based systems 10 and/or 20 may be located in an individual's home, at any business location, or may even be present in a post office lobby for after hours usage. Moreover, processor-based systems 10 and 20 may be located at sites remote from one another, interconnected by computer network 105. Computer network 105 may be a wide area network (WAN) capable of providing information communication between systems 10 and 20 separated by large physical distances or alternatively may be a LAN providing information communication between systems 10 and 20 located proximal to each other. It shall be understood that computer network 105 may be any information communication scheme capable of providing information communication between systems 10 and 20.

In a preferred embodiment, systems 10 and 20 are each a PC. However, it shall be understood that systems 10 and 20 could be parts of a mainframe computer system (which, for the purposes of this application shall include miniframe computers as well as all other suitable processor-based systems) or, as illustrated in the utilization of network node device 20D, of differing types. Selection of systems 10 and 20 to be utilized by the present invention is only limited by the systems' ability to interface with each other and a portable processor device 18 while combining to execute the E-STAMP program.

Typically, a user will buy a portable postage dispensing device 18, which could contain a quantity of postage, included with a copy of the E-STAMP program. The user will then install the E-STAMP program on the user's host processor-based system 10.

Figure 2A:
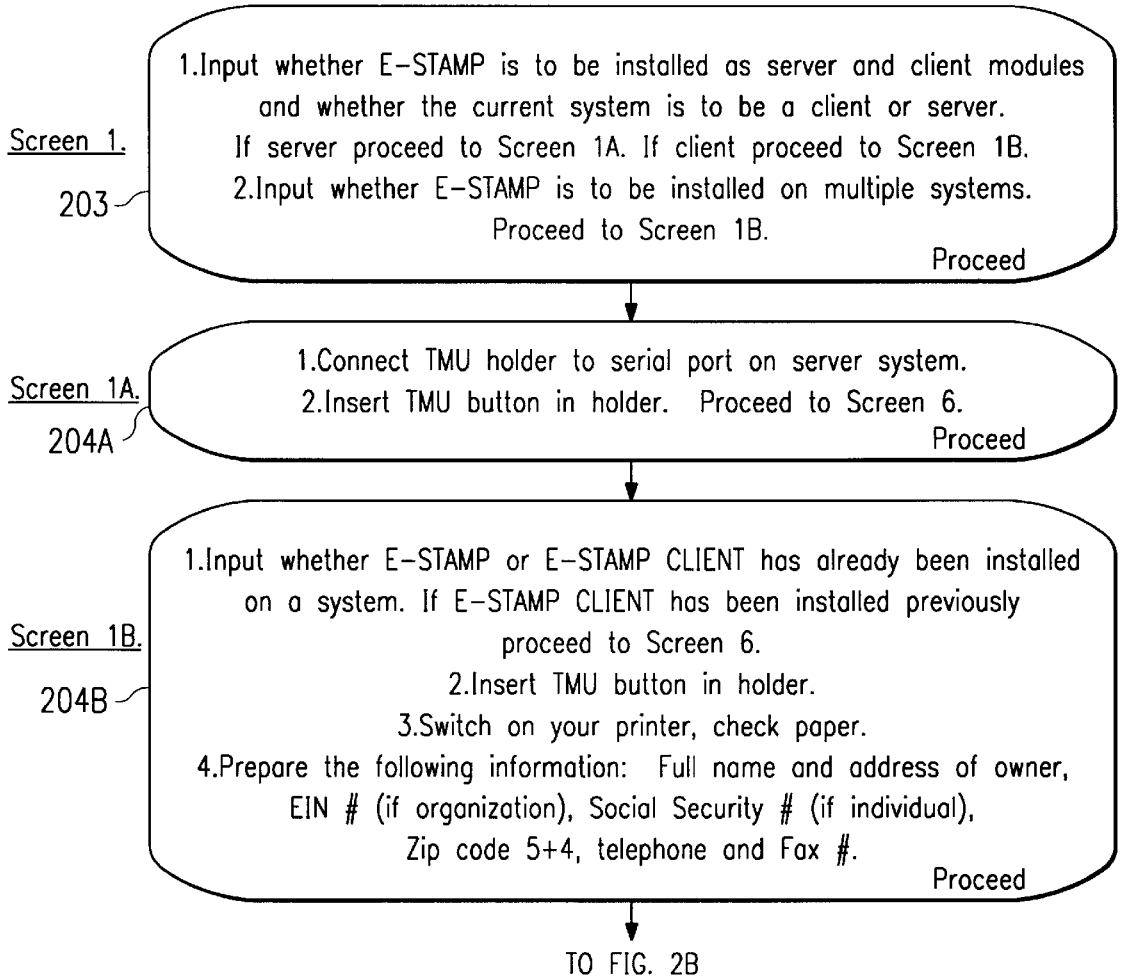
FIGS. 2A–2B illustrate an embodiment of user instructions and screen prompts utilized by the present invention to interface with a user when installing the program on the processor-based system for implementation of the present invention.
Figure 2B:
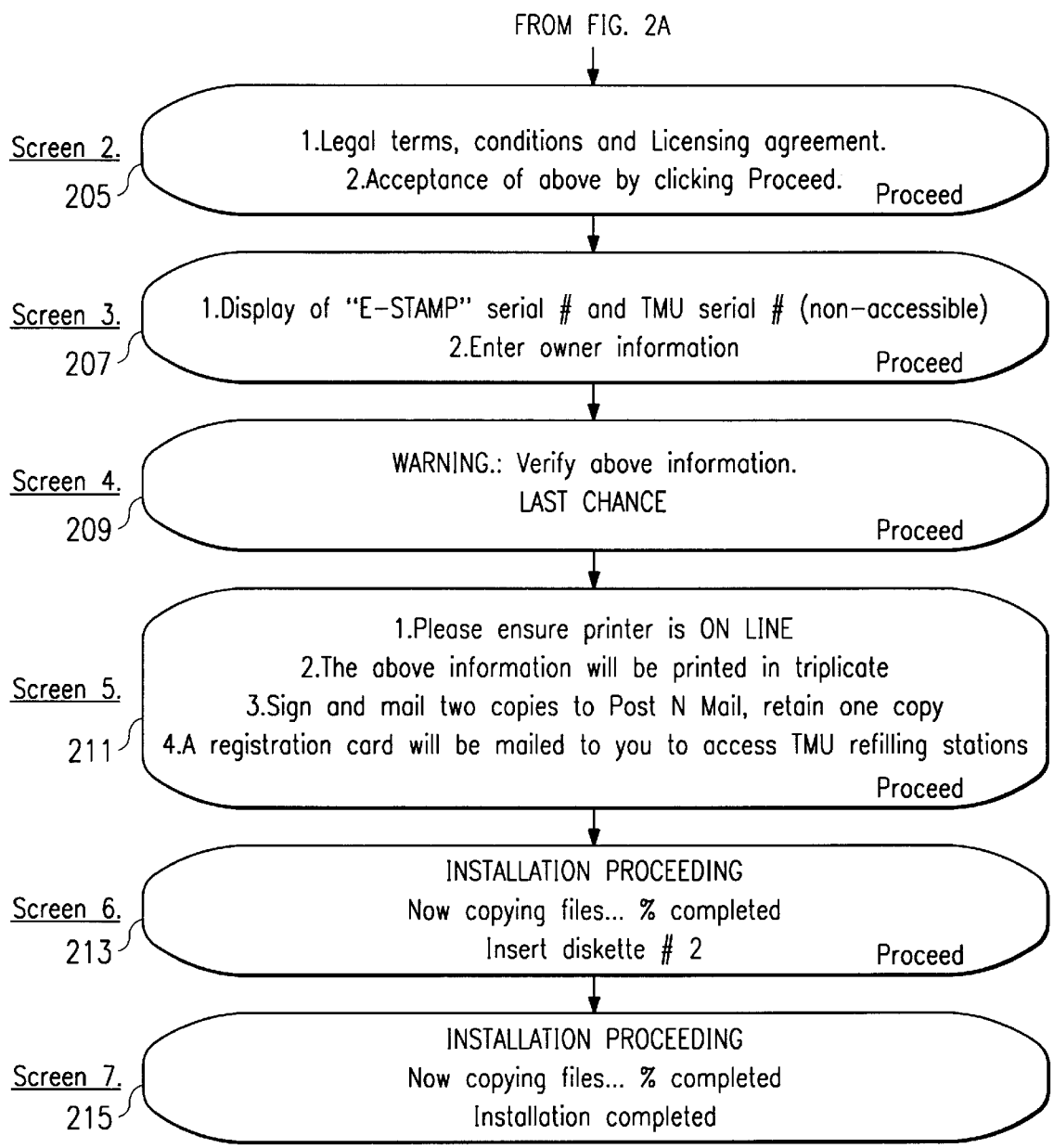

FIGS. 2A–2B illustrates one embodiment of user instructions and screen prompts to be followed by the user during the installation of the E-STAMP program. The instructions and screen prompts illustrated in FIGS. 2A–2B reflect the installation of the E-STAMP program in a Microsoft windows operating environment on a PC equipped to communicate with a portable processor 182 and portable processor holder 172. Of course, other means could be employed for implementing the present invention within a processor-based systems 10 and 20.

The user installation instructions 201 inform the user how to pull up the E-STAMP installation program. Once the installation program is initiated, screen 203 will appear. The screen represented by box 203 accepts the user's determination of how the E-STAMP program is to be utilized. Specifically, the user inputs information indicating whether the E-STAMP program is to be operated in separate modules on systems 10 and 20.

Upon indication that the E-STAMP program is being installed as the E-STAMP SERVER module, the screen represented by box 204A instructs the user to connect the TMU holder 172 to a serial port and to insert TMU button 182 into holder 172. This coupling of TMU button 182 provides the installation routine the opportunity to verify information communications between the E-STAMP SERVER program and TMU button 182. Thereafter, the screen represented by box 213, discussed below, is implemented.

Upon indication that the E-STAMP program is not being installed as the E-STAMP SERVER module, the screen represented by box 204B instructs the user to indicate whether the E-STAMP CLIENT or the E-STAMP program in its entirety has already been installed. If the appropriate program has not been previously installed, the user is then instructed by Screen 1B to insert TMU button 182 into holder 172, turn on printer 19 that has been coupled to system 10 and check to see that printer 19 is supplied with paper. Screen 1B further requests that the user prepare the following information: the user's full name and address, an identification number for the user (i.e., an employer identification number (EIN#), if the user is a business or organization; or a social security number (SS#), if the user is an individual), the user's ZIP code, the user's telephone number and the user's fax number. However, if the user indicates that E-STAMP or E-STAMP CLIENT has been previously installed, the screen represented by box 213, discussed below, is implemented.

The next screen, represented by box 205, displays the E-Stamp License Agreement with its legal terms and conditions. Acceptance of the terms and conditions set out in the license agreement is indicated when the user continues with the installation program. Upon acceptance of the license agreement, the screen represented by box 207 will appear and display the E-STAMP serial number and TMU serial number. At this time the user-specific information requested by box 203 should be entered into the E-STAMP program. Once the user has entered the user-specific information, the screen represented by box 209 will appear warning the user to carefully verify the correctness of the entered information.

After verifying the information added into the E-STAMP program, the screen represented by box 211 will remind the user to ensure that a coupled printer 19 is on line. The user information entered into the E-STAMP program will then be incorporated into a user registration form, one embodiment of which is illustrated in FIG. 3A. The E-STAMP registration form will be printed in triplicate. The user is instructed to sign and mail two copies of the registration form to the creator of the E-STAMP program, E-Stamp Corporation and to retain one copy of the registration form. This screen also informs the user that a registration card will be mailed to the user in order that the user may access TMU refilling stations.

The E-STAMP program installation continues with a screen, represented by box 213, which describes the progress being made in installing the necessary components of the E-STAMP program, and a screen, represented by box 215, which informs the user when the E-STAMP program installation has been completed.

Referring to FIG. 3A, there is illustrated a preferred embodiment of the E-STAMP registration form. The registration form includes information such as the portable processor button serial number 31, the E-STAMP serial number 32, the date and time that the E-STAMP program was installed 33, and user-specific information 35 (e.g., name, address, telephone and fax numbers, and identification number), and a copy of the E-Stamp License Agreement 36 having an identified location 300 for the user to sign. A preferred embodiment of the E-STAMP registration form will also contain all of the information needed to specifically identify the TMU button, E-STAMP program, and registered user in an encrypted format 301 FIG. 3C. The encrypted information 301 will be in a machine-readable graphical security interface, such as a standard bar code. In the preferred embodiment, the code would be the PDF417 code discussed in more detail below.

As will be discussed, indicia 300 shown in FIG. 3B also has a logo portion 39 and a printed "human readable" portion 38 as well as an encoded portion 37. It is this portion 37 which is read and, if desired, compared to a database at a location remote from the user, remote from the generating PC and remote from the portable processor.

The standard bar code contains white and dark areas in the form of bars that can be read by a laser scanner. The laser scanner illuminates the white and dark areas with a light of a certain frequency. The light is reflected back to the laser scanner in such a way as to indicate the pattern of white and black areas within the bar code. Since white areas reflect much more light than dark areas do, a perpendicular scan of the bar code will allow the scanner to translate the reflected light into the coded information. More than 20 linear bar code languages have been developed, each with its own specifications for how many bars and spaces make up a character, how characters are to be arranged, whether the characters can be letters as well as numbers, and so forth. The most widely-used bar code is the Universal Product Code (UPC) seen on everyday grocery items. The standard bar code currently used by the post office is PostNet described in Postal Service Publication number 67.

More sophisticated graphical security interfaces have been developed over the last decade, such as Intermec Corporation's Code 49 and Laserlight System Inc.'s Code 16K. A major advantage of these more sophisticated symbologies is that they contain an error-correction formula which can often recover the entire message even if parts of the code have been torn or damaged.

A preferred embodiment of encrypted information 301 is a graphical security interface developed by Symbol Technologies of Bohemia, N.Y. and is called PDF417, a portable data file. PDF417 is a graphical security interface constructed from data units called "words," each of which is 17 modules long. Bars are made from filling in up to six consecutive modules and each unit has four separate bars and four spaces. In essence, PDF417 can stack the equivalent of up to 90 one-dimensional bar codes, each just three hundredths of an inch high. Thus, the PDF417 symbology is more complicated to produce and scan than is the typical one-dimensional bar code and allows for a denser coding of information. Because the PDF417 symbology specification includes sophisticated protocols for error-correction, the actual density of information is highly variable, but can be more than ten times the amount of information found in U.S.P.S. PostNet bar code, per square inch. PDF417 is available from Symbol Technologies, Inc., 116 Wilbur Place, Bohemia, N.Y. 11716 and the operation of the PDF417 is detailed in PDF Primer obtained from them and is hereby incorporated herein by reference.

When E-Stamp Corporation, the system administrator, receives the signed License Agreement from the user, the encrypted information 301 can be scanned with a laser scanner so that the information contained therein can be automatically transferred to a Registered User's database. The purpose of this database will be more fully discussed below. When the encrypted information 301 has been transferred to the registered user's database, a registration card containing a serial number will be printed and mailed to the registered user. The valid entry of the user registration information in the E-Stamp Database guarantees that user's mail to pass verification at the U.S. Post Office, for the letter scanning equipment will be connected to E-Stamp for real-time verification of mail. Alternatively, letter scanning equipment may be updated in batch with information indicating registration of postal storage devices, or registration information may be provided to the postal service by any means deemed efficient to indicate the authorized use of a postal storage device of the present invention.

System 10 may be utilized at a customer site for permitting a user to retrieve postage stored within portable postage dispensing device 18, via the E-STAMP program, for subsequent printing as a postage indicia onto a piece of mail through printer 19, coupled to system 10, or printer 29, coupled to system 20. The utilization of the E-STAMP program by a customer will be further described below.

E-STAMP FUNCTIONALITY DESCRIPTION

Once the required amount of postage has been transferred to the portable processor button 182, the user may then physically carry the button back to the user's business location and couple the portable processor button 182 to a processor-based system through button holder 172 for information communication with system 10. Upon invocation of the E-STAMP program by the customer, the customer's processor-based system 10 can access the postal amount stored in portable processor button 182 and download portions of the stored postage to the E-STAMP program to be used for printing postage indicia on pieces of mail.

Figure 7:
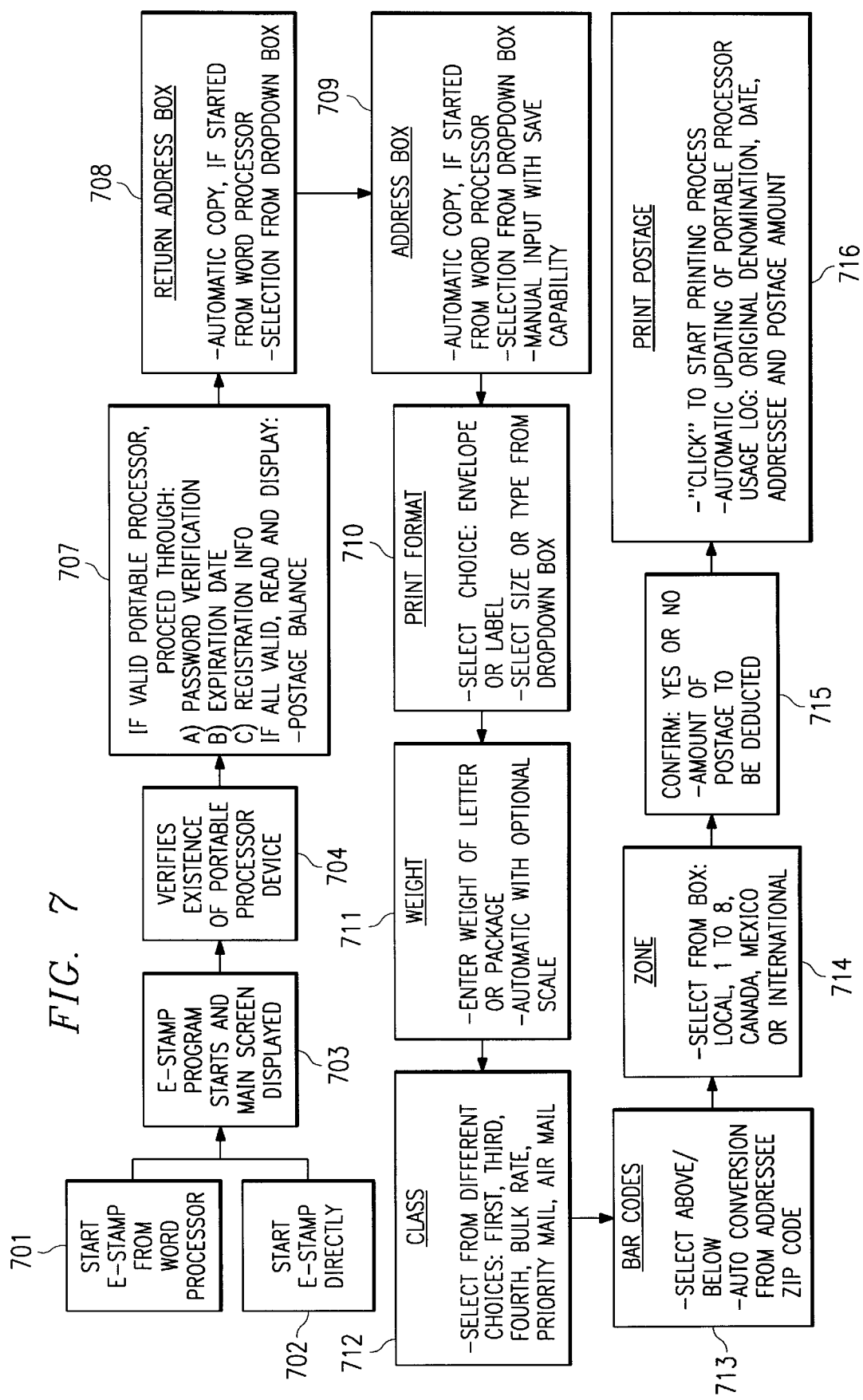
FIG. 7 illustrates a flow diagram of the operation of the present invention within a host processor-based system.
Figure 8:
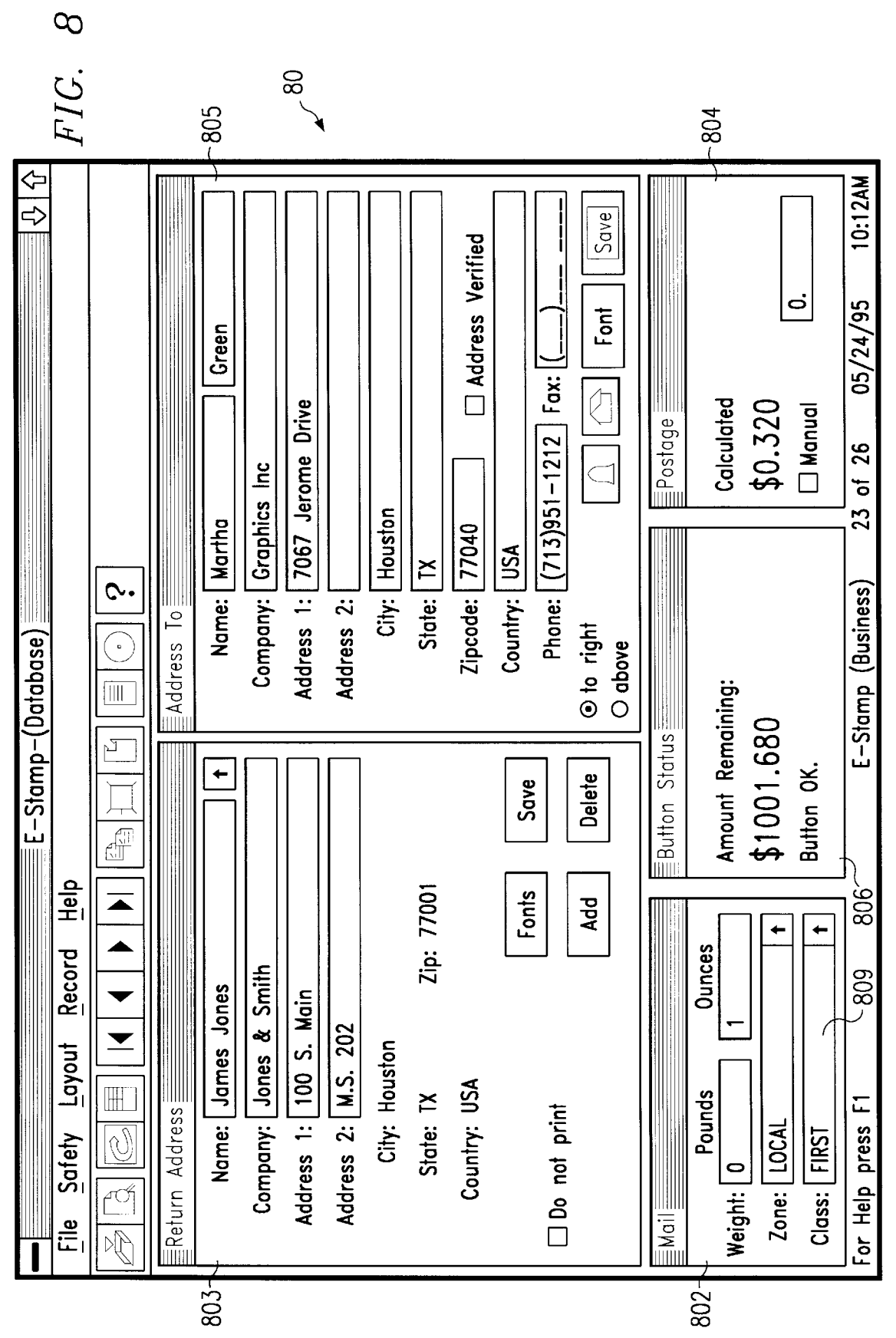

Referring next to FIG. 7, there is illustrated a flow diagram of the process employed within processor-based system 10 and/or system 20 configured for allowing a user to print a postage indicia. As previously discussed, the E-STAMP program may be a stand-alone program, or it may be associated and coupled with a word processor or other document producing program, such as a spreadsheet, database, accounting system, or graphics program. Therefore, the E-STAMP program may be started directly (step 702) or via step 701. Thereafter, at step 703, the E-STAMP program shows display 80, illustrated and described with respect to FIG. 8, to the user.

Next, in step 704, as shown in FIG. 7, the E-STAMP program verifies the existence of portable processor button 182 in communication with processor-based system 10. The process of portable processor verification represented by box 704 includes several steps as follows:

Step 1—Successful communication with portable processor within its strict communication protocol and command structure already demonstrates likelihood that at least the type of button is correct (i.e., it is more than just a Dallas Semiconductor button, it is a button running the proprietary code particular to the postage application outlined herein).

Step 2—Serial number of portable processor is verified against encrypted registration information in the PC.

If a valid portable processor button is in information communication with system 10, at step 707, other information stored in the secure environment of the portable processor is demanded via the common command structure used for host-to-button communications. The process of portable processor connection represented by box 707 includes several steps as follows:

Step 1—E-STAMP passes user password entered to portable processor and verification takes place within the secure environment of the portable processor button to guarantee maximum secrecy of the password. Password is never stored in processor-based system 10.

Step 2—If the portable processor reports a result from Step 1 as a password match, E-STAMP will then be able to access the command facilities of the portable processor to ultimately print postage indicia thereby deducting value from the internal data representation of credit within the portable processor.

Step 3—Portable processor verifies its own expiration date based on an internal real time clock. Processor-based system 10 never has opportunity to interfere in this decision.

Step 4—If the result of the expiration date check of Step 3 is that the portable processor is still valid, the user registration information stored in the processor-based system 10 is passed to the portable processor for validation.

Step 5—If the check of Step 4 is valid, the current meter balance is displayed in the center-button part of the E-STAMP program screen block 806, indicating that a valid portable processor button is available for use in printing postage indicia. If any of the above checks are invalid, a valid postage dispensing device was not detected.

Next, at step 708, return address box 803 is completed automatically or manually. The address within 803 may be automatically entered from the adjoining word processor program, the address may be selected from a drop-down box (not shown), or the address may be manually input. Any entered address may be saved within the E-STAMP program. Additionally, if a return address is not desired, it may be omitted.

Thereafter, in step 709, the contents of address box 805 are entered in a manner similar to the contents of return address 803.

Any one of a number of "time-out" scenarios could be employed. For example, a preestablished time of three months from last refilling, or the time-out could occur a certain time after non-use.

Figure 8A:
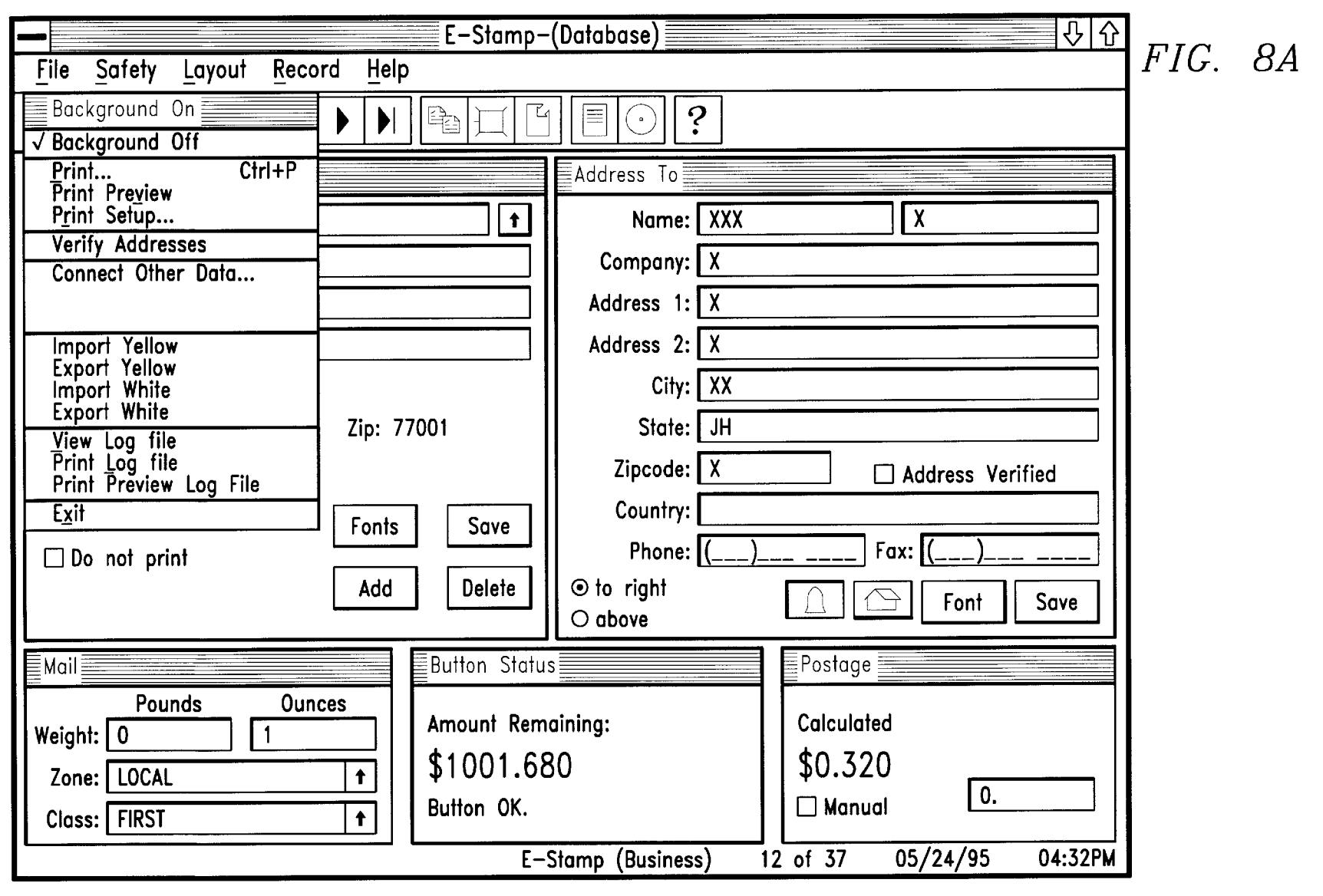

Next, at step 710, the user may select the print format by the use of the "Print Setup" standard dialogue box selected in the "File" Menu as pictured in FIG. 8A. As illustrated, the postage indicia may be printed on a label through printer/label maker 19 or 29, or a choice may be made to print the postage indicia on an envelope inserted within printer 19 or 29, which may be chosen to be a standard size or a nonstandard size as selected by the user. Of course selection of either printer 19 or 29 may be accomplished through the use of print managers well known in the art, or may be accomplished by an option (not shown) within the E-STAMP program. Note that if the postage indicia is to be printed on a label, it may be desired that the return address within 803 and the address within box 805 not be printed.

Figure 9:
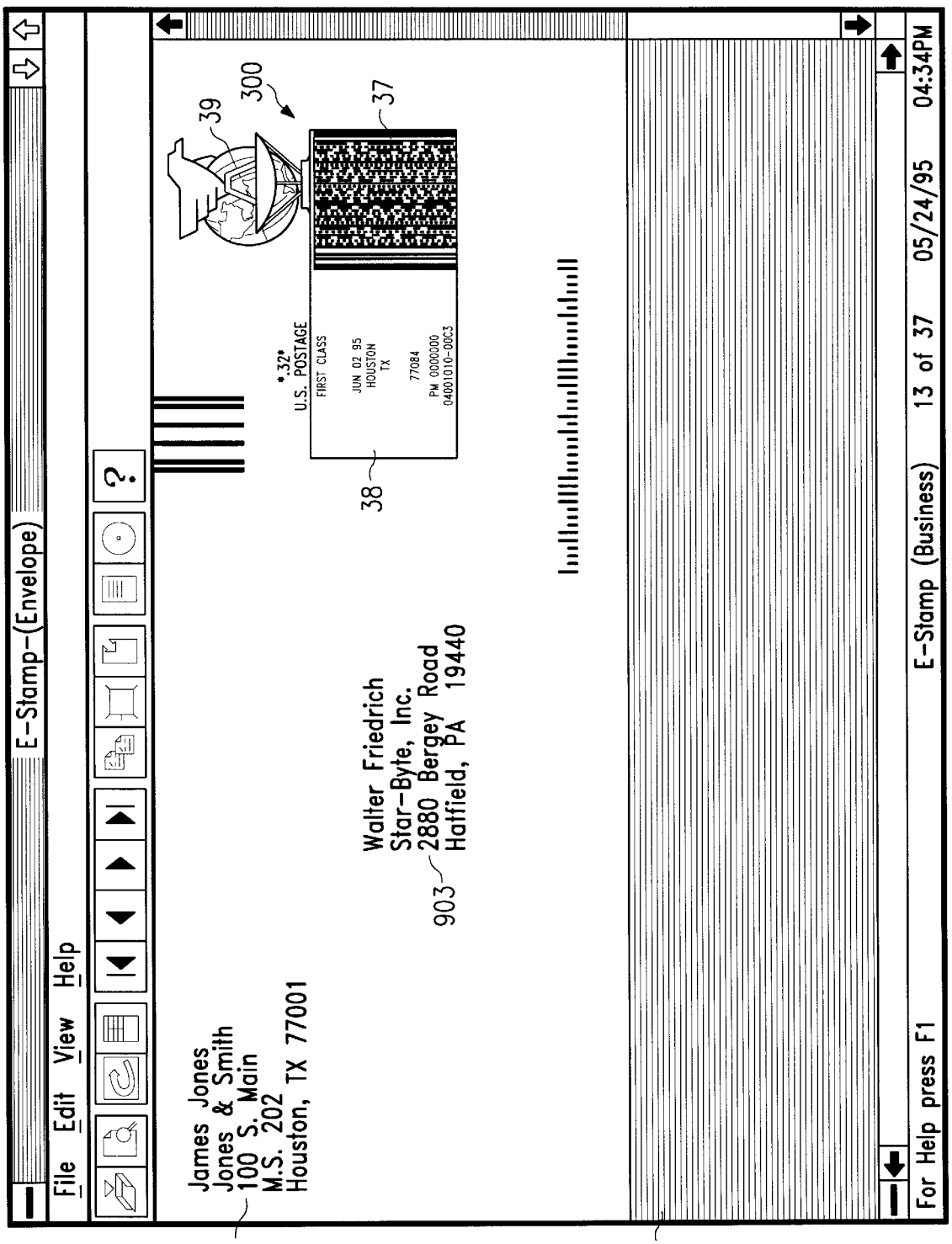
FIG. 9 illustrates an envelope used to display the postage indicia printed on a letter.

Alternatively, the postage indicia with or without the addresses within boxes 803 and 805 may be printed on a flyer, a pamphlet, a postcard, a sheet of paper, or any other document. Whenever the indicia is printed on a letter, along with the addresses in boxes 803 and 805, that letter may be folded so that the indicia will show through an opening or window in the top right hand corner of a specially designed envelope 900 an image of which is illustrated in FIG. 9 and as shown in co-pending Design patent applications Ser. No. 29/022,913, filed May 16, 1994, and Ser. No. 29/039,328, filed May 24, 1995, issued Jun. 17, 1997 as U.S. Pat. No. Des. 380,007 both incorporated by reference herein.

Envelope 900 may be a standard or non-standard size with any number of windows as designed by the user. Typically, envelope 900 will have a first window (not shown) in the top right hand corner for the printed postage indicia to show through. Envelope 900 may also have other windows for the addressee's name and address (903) and for a return address (902) to show through. Envelope 900 may have glassing paper, or other transparent covering material covering the described windows such that the postage indicia and other imprinted information is protected from inadvertent detachment and adverse conditions (such as inclement weather).

Thereafter, in step 711, the user enters the weight of the package or letter associated with the postage indicia. This weight may be entered manually, or automatically through the use of scale 103 coupled to processor-based system 10 in a manner well known in the art. In step 712, the user selects the class of mail from the choices shown in box 809.

Thereafter, in step 713, the user may select the location of routing information for the recipient address. Such information will be automatically extracted from the address, and formatted in the PostNet symbology for ZIP+4 information, as provided in Postal Service Publication 67 and incorporated herein by reference. Thereafter, in step 714, the user may select a postal zone. After step 713, at step 714, the user may select the postal zone, such as local 1–8, Canada, Mexico, or international.

Typically the postal indicia may include any combination of the following information: the date, the postage dispensing device serial number, the sender's ZIP code, the addressee's ZIP code, the expiration date of the postage dispensing device, the cumulative values of the strike and dollar counters, E-STAMP registration number and the post office identification number. The postage indicia shall contain this information which was encrypted by the portable postage dispensing device and presented to the outside world thusly, thereby guarding the data content of the indicia a secret to all but the U.S. Post Office scanning equipment which will be charged with decoding the indicia bar code and decrypting the information for use in verification of the integrity of the indicia and its appropriateness for the mail piece. The postage indicia physical form may encode the encrypted information within an insignia or design, or it may appear as a background for the postage amount printed in a visually recognized form.

Furthermore, the use of the POSTAGEMAKER program in conjunction with a database program will allow tracking the authorized postage by post office location (or ZIP code), post office agent, portable postage dispenser serial number, etc. This information can be easily compiled to determine post office sales, market forecasts, etc.

The E-STAMP program will automatically incorporate the aforementioned entered parameters—weight, class, zone—in order to correctly calculate the correct postage, as shown in box 804, to print in conjunction with the postage indicia and to deduct from the postage amount stored within portable processor button 182.

Lastly in step 715, the user confirms his/her choice to print the postal indicia or not, thereby with the understanding that the amount of postage will be deducted from the balance in the portable postage dispenser 182. If YES is chosen, control passes to step 716 and the E-STAMP program utilizes the input/output ports of processor-based system 10 to send to printer/label maker 19, the correct data pertaining to the indicia to be printed on an envelope, letter, card or label.

The amount of postage printed on the indicia is automatically deducted from the amount stored within portable processor button 182 by the button itself on command from the E-STAMP program in step 716. Other internal information is automatically updated, including the usage record for this particular portable processor, which is kept internally, but accessible to the outside host via authorized commands. Such usage records may include, but are not limited to, addressee, postage amount, and date.

Note that during the selection of the various parameters within display 80, the E-STAMP program may be implemented to update the postage amount displayed within meter display 806 as the ongoing communications dialogue between the portable processor and processor-based system 10 is essentially in real time.

Box 802 is provided for the user to select the location (ZONE) to which the mail is to be sent. The location may be used to calculate the correct postage for the indicia. The date that the mail is stamped is automatically adjusted every day by a real time clock which exists in the safe confines of the portable processor and therefore cannot be tampered with by external influence. This will help prevent pre-dating or post-dating of mail. The date and if desired, time, shall also be encrypted in the postal indicia for external verification.

Of course, the mailing date may be user adjustable where pre-dating or post-dating is not a concern. In an alternative embodiment, for example, adjustment of the mailing date may be allowed for post-dating the postal item while restricting pre-dating. Alternatively, an additional date may be input to indicate the anticipated date of mailing while the actual date of metering remains unchanged.

The "Print Preview" option selected from the file menu in FIG. 8A is provided to not only get an idea of how the finished envelope (or label or other document) will look but to add personalized items such as a greeting or graphical bit-map which might represent a company logo for instance.

The aforementioned steps may be repeated for a subsequent piece of mail, or the user may decouple the portable process button 182 from holder 172.

Using the E-STAMP system and method, users like lawyers, accountants, advertising agencies, etc., who bill their clients for postage will be able to keep track of postage expenses on a per-client basis.

POSTAGE REFILLING CONTROL

In the preferred embodiment, portable processor button 18 includes secure non-volatile (battery-backed or otherwise stable) memory and a CPU (central processing unit) capable of executing instructions. These items are enclosed in the confines of a hermetically sealed metal can. The internal operating code which gives the portable processor its useful attributes is kept in ROM (read-only memory) and/or RAM (random access memory). Additionally, the extremely sensitive data representations of monetary value, strike counters, usage logs, refilling logs and encryption keys used to encrypt information passed externally is kept in non-volatile memory not directly accessible by processor-based system 10 executing the E-STAMP program.

As discussed in further detail below, there are three different types or applications for the portable processor button 18 which relate to different levels of authority and use: master buttons (authority level 2) which are provided to a limited number of supervising postal authority personnel; agent buttons (authority level 1) which are provided to authorized postal agents who perform refill operations on used portable postage dispensing buttons and initialization operations on new portable postage dispensing buttons; and postage buttons (authority level 3) which allow the postal customer (user) to print an authorized amount of postage indicia using a separate processor-based system controlled by the user. In actuality, the first two types of buttons are known as security devices which grant authority to serve credit and maintenance to the third type of button which is a postage dispensing device usable by postal clients.

Figure 10A:
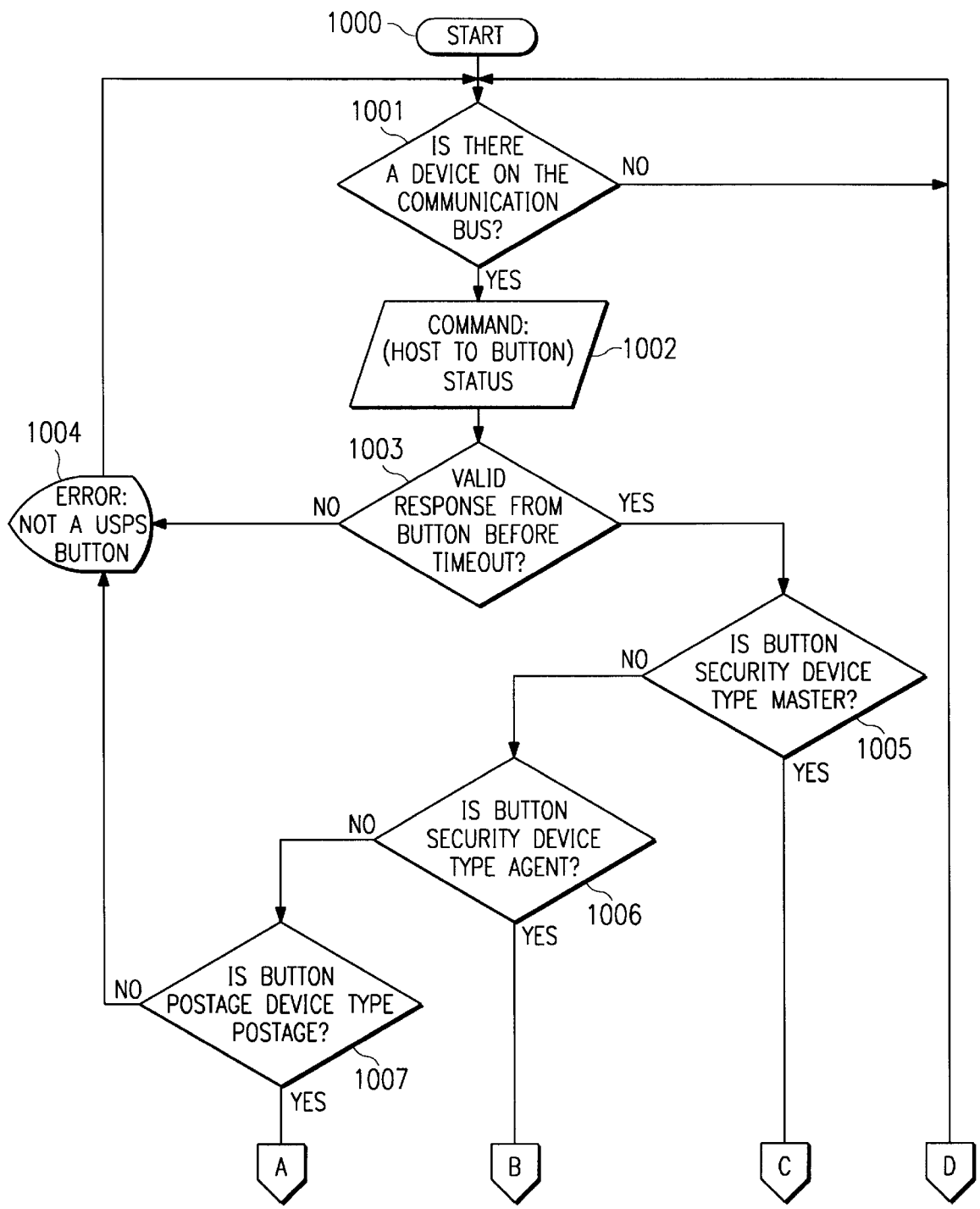
FIGS. 10A–10F illustrate various management functions associated with the master, agent and postage buttons.
Figure 10B:
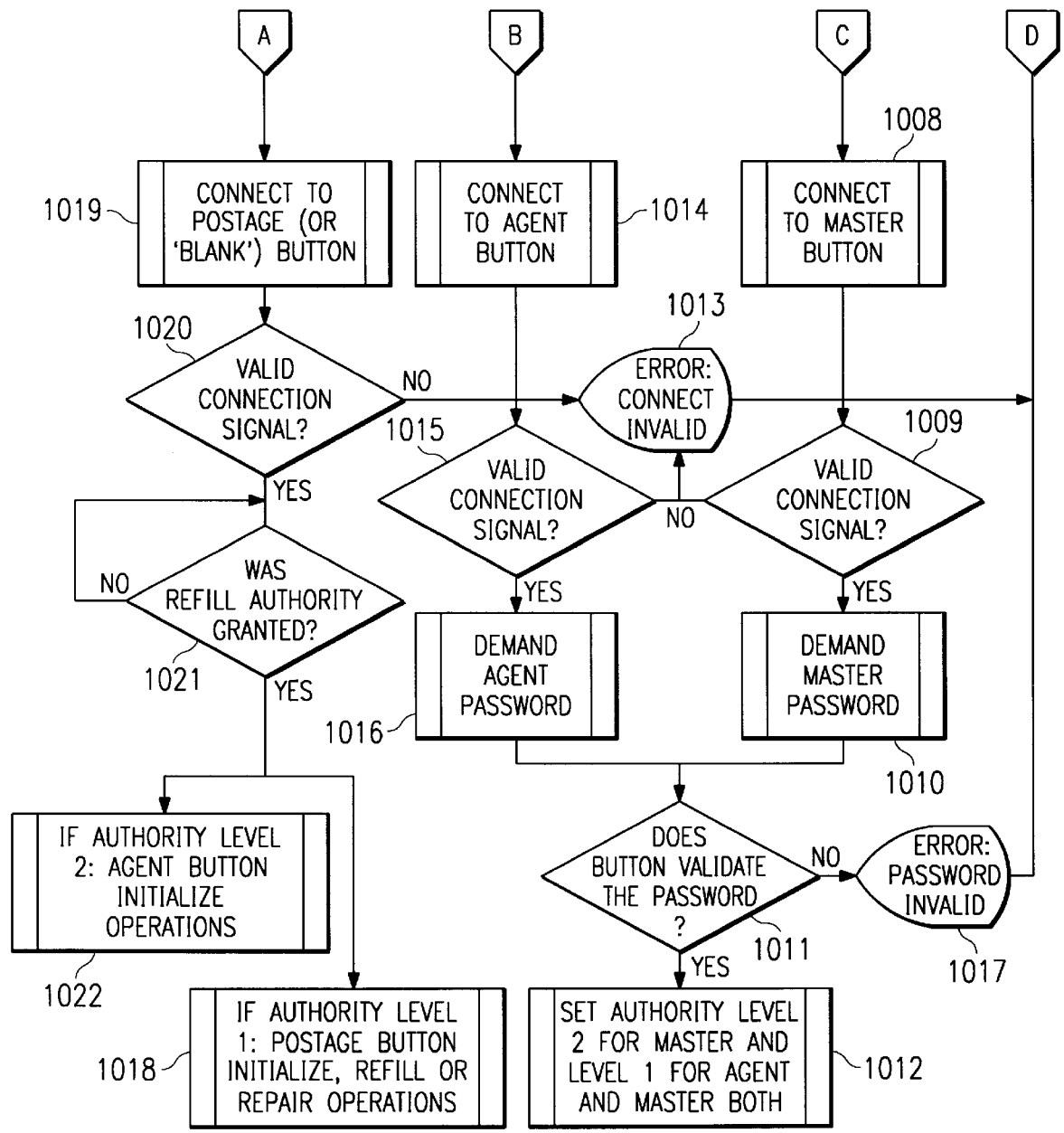
Figure 10C:
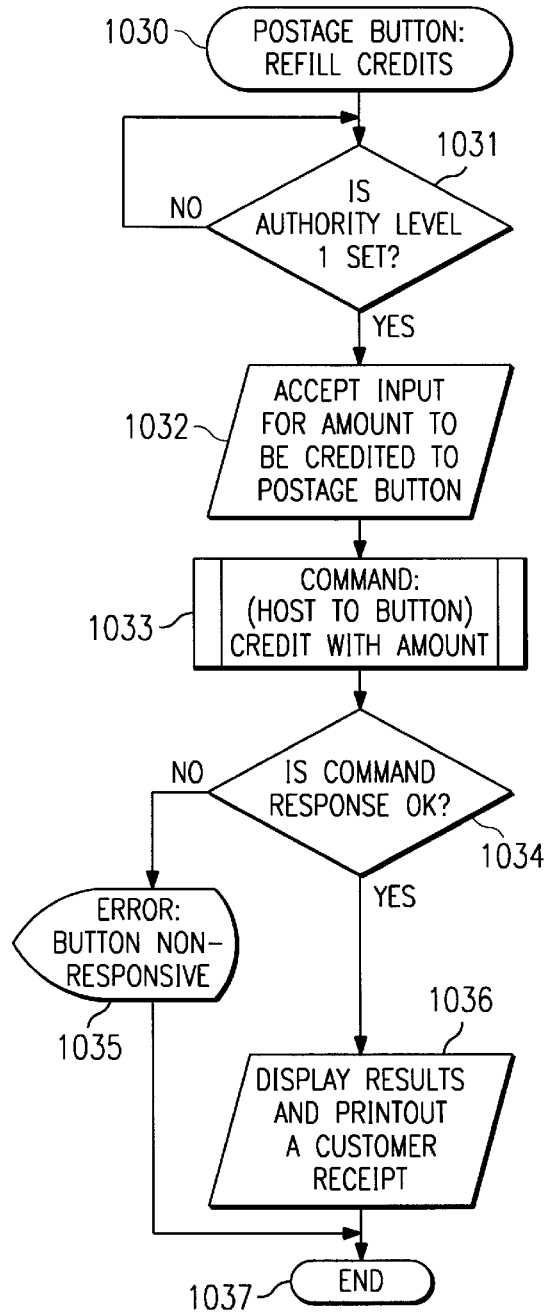
Figure 10D:
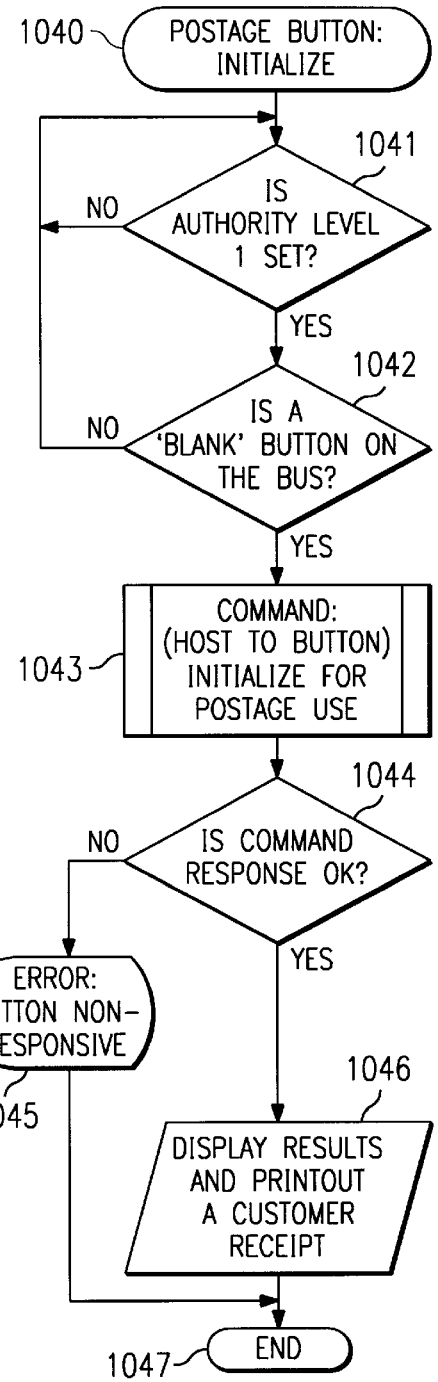
Figure 10E:
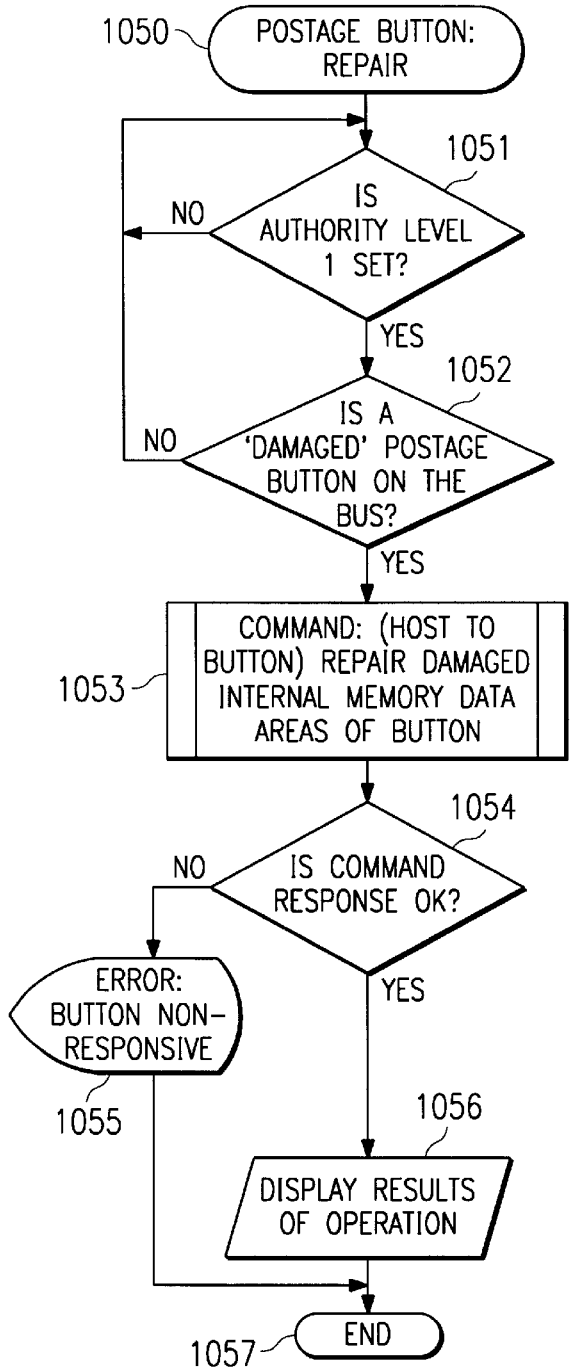
Figure 10F:
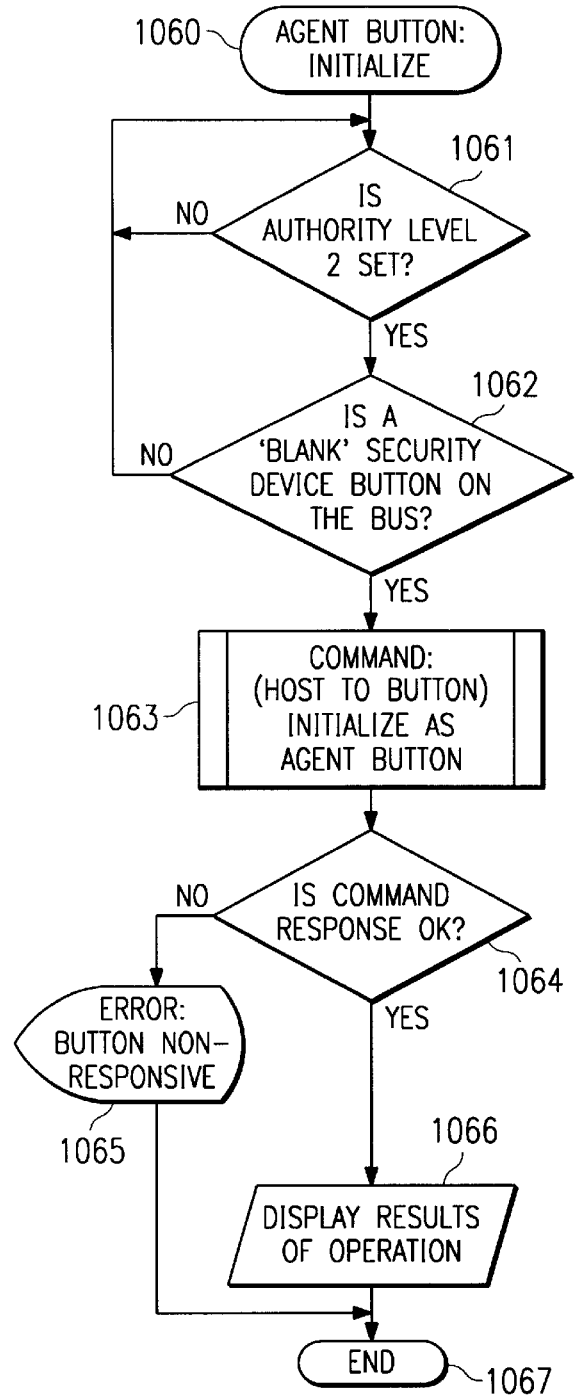

A preferred embodiment of initialization of "blank" buttons to operate as postage or security buttons are illustrated in the flow diagrams of FIGS. 10D and 10F. Although buttons may be initialized upon manufacturing to function as the variously defined buttons of the present invention, it is envisioned that an issuing authority may wish to be able to directly expand the availability of suitable devices and, thus, would utilize an initialization procedure as depicted in FIGS. 10D and 10F.

Similarly, as the portable devices of the present invention may be subjected to handling and environments which may cause damage to information stored therein, a means by which damaged buttons may be repaired is advantageous. FIG. 10E illustrates a preferred embodiment of repair of a postage button.

In a preferred embodiment, in the postal authority (or authorized refill center), both a valid master and a valid agent button must be in information communication with the Postal Authority/Refill Station (POSTAGEMAKER) version of system 10, such as depicted in FIG. 1A, before a refill or initialization operation of a postage button can take place. Although a preferred embodiment utilizes button holder 17 coupled directly to system 10 for the POSTAGEMAKER program, a multiple processor system, utilizing systems 10 and 20 as discussed above in conjunction with the E-STAMP program, may advantageously be utilized for implementation of the POSTAGEMAKER program. Of course, the use of security buttons may be omitted where unauthorized refilling of postage storage devices is not a concern, such as, for example, where the host system used to refill the postage storage devices is itself in a secured area.

The master, agent and postage buttons are all validated by the Postal Authority/Refill Station software during refill operations. Additionally, each postage button (level 3) is validated by the customer's E-STAMP software prior to the commencement of any indicia printing operations. The sequences for validating the master, agent and postage buttons using the Postal Authority/Refill Station software are depicted in FIGS. 10A–10B.

The Postal Authority validation procedure for a button in information communication with system 10 begins at Step 1000, with the initiation of the POSTAGEMAKER refill station software. For discussion purposes, assume only one portable processor button 18 has been coupled to system 10 at this point. At Step 1001, the software reads the communication bus to see if any valid devices exist on it. If no, it just continues to look in a "loop." If yes, the POSTAGEMAKER software running in system 10 sends a command to the portable processor button 18, as in Step 1002, to demand status information for the button. The button, which is reset from a "sleep" or dormant state when it receives the command, can verify its contents to be correct and that it is the type of button (POSTAGE or SECURITY DEVICE) that system 10 expects to work with. If a valid response does not come back before a time-out in Step 1003, it is assumed that the button on the communication bus is not valid and an error message would be displayed at Step 1004. If the response is OK, it is implied that there is a good chance this is a E-STAMP-programmed button because of its validated response to the E-STAMP-specific command issued to it.

At this point, depending on the type of button expected, the status information is checked to see if the button is of that type in Steps 1005, 1006 and 1007. If the button type is master at Step 1005 proceeding to Step 1008 of FIG. 10B, otherwise proceeding to Step 1006. If the button type is agent at Step 1006 proceeding to Step 1014 of FIG. 10B, otherwise proceeding to Step 1007. If the button type is postage at Step 1007 proceeding to Step 1019 of FIG. 10B, otherwise generating an error at Step 1004. Based on the decision of what type it is, a connect operation for that type of button is attempted in Step 1008, 1014 or 1019. If master or agent security device, a security device type of connect is issued to the button and a correct response must be received by system 10 (Steps 1015 and 1009) before proceeding or an error is generated (Step 1013). If the correction signal is valid at Step 1009 proceeding to Step 1010. If the connection signal is valid at Step 1015 proceeding to Step 1016. In Steps 1010 or 1016 a master or agent password is demanded of the user depending on which type of button is being serviced. Step 1011 validates this password by passing the password to the button so that it can verify it in its own secure environment. The password is never stored in system 10 for security reasons. A positive validation of password from the button grants the host authority level of 1 for master and agent simultaneously on the bus and authority level 2 for master only on the bus at Step 1012, otherwise an error is generated (Step 1017).

Assuming that the button was a postage type and the connection which was made in Step 1019 is made and verified in Step 1020, the POSTAGEMAKER software does not require the validated password of the postage button to continue. However, it will check that the proper authority level has been previously granted by the presence of both a validated agent and master button on the bus at the same time in Step 1021. If the proper authority level has not been attained, no operations may be performed on the postage button. If that authority exists, control can proceed to Step 1018 in the case of a customer demand for new button initialization, old button credit refill or old, damaged button repair operations or to Step 1022 in the case of agent button initilization operations. Of course if the use of security buttons is omitted, as in an alternative embodiment discussed above, the POSTAGEMAKER software needs only to verify the presence of a suitable postage storage device.

The credit refill operation to a used button is depicted in FIG. 10C, step 1030. The credit command must first verify, in step 1031, its authority level is correct and set at two by the presence of valid and password-unlocked master and agent buttons looping back to step 1031 if not. Provided this is the case, in step 1032, the amount of postage to be credited to the button is input by the authorized agent into a form dialogue window and validated for correctness by the POSTAGEMAKER software. In Step 1033, the CREDIT command, amount and a conglomeration of encrypted data known as a security packet are sent to the postage button which must decode and validate and if all appears to be valid, perform the credit operation before the time-out signified in step 1034 which will occur if the response does not come back from the button to the system 10 in a specified period of time, otherwise an error is generated (Step 1035). If the response is acceptable at step 1034, in step 1036, a receipt is printed out for the customer and the results are written in a transaction log stored on system 10 or on another system in information communication with system 10. It is the security packet that allows the button to continue with the credo operation. This data structure has a predefined layout and contents which are encrypted using a certain key and method of encryption. This security packet contains data items, such as identification numbers of master and agent issuing the credit to the button, host date/time (which must match not exactly but closely with internal button date/time), workstation number for system 10 running the POSTAGEMAKER software and postal authority location identification. Other data items could be used for checking purposes. This security packet is different in form and function from the one described here below in FIG. 6.

In Step 1036 (FIG. 10C), a receipt is printed out for the customer and the results are written in a transaction log stored on system 10 or on another system in information communication with system 10, such as host system 20 running E-STAMP SERVER. Thereafter the credit refill operation is ended at Step 1037.

Figure 15:
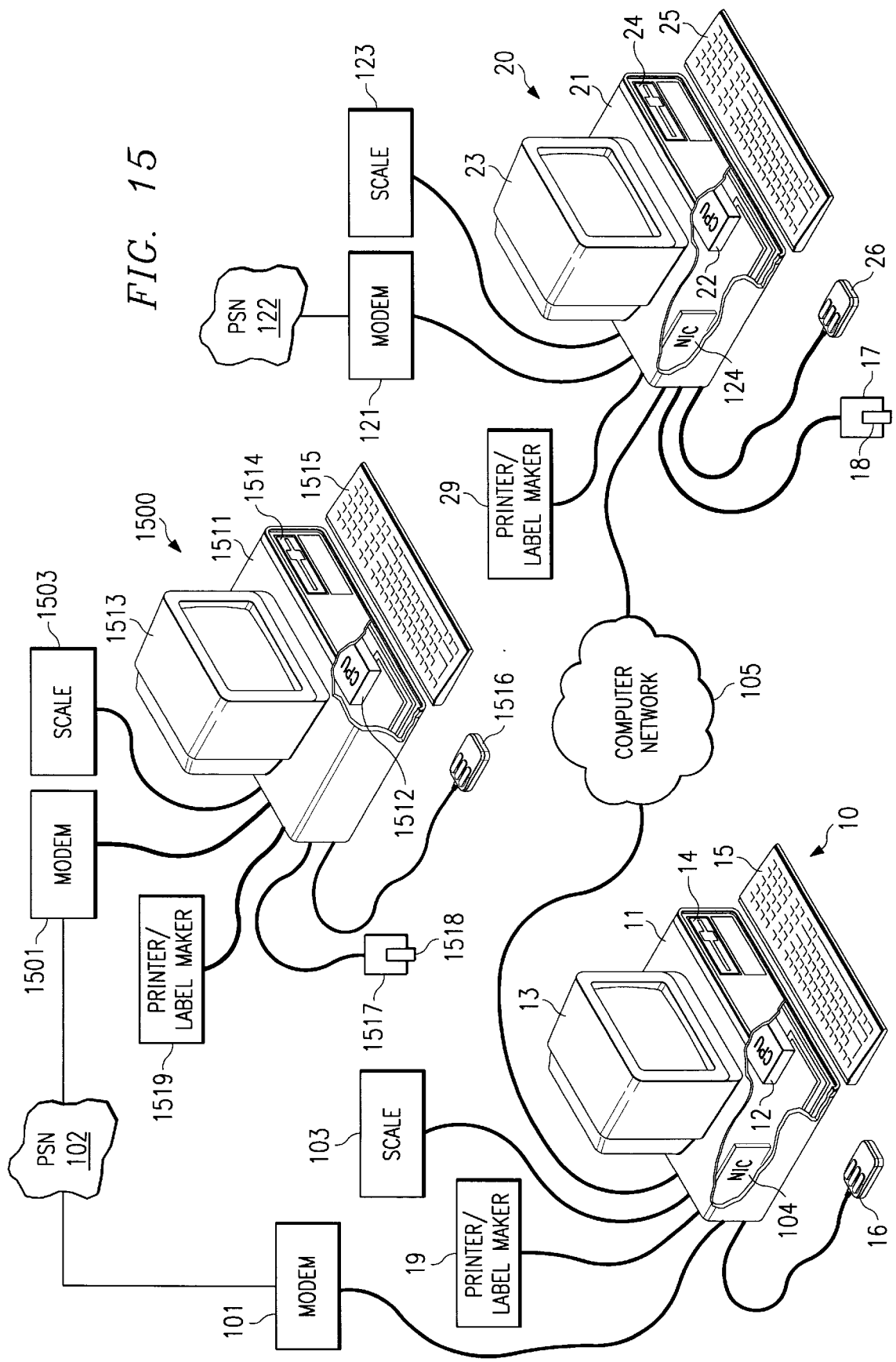
FIG. 15 illustrates processor based systems for implementation of remote refilling of the postage storage device of the present invention.

Of course the postage and/or security buttons may be coupled to the host processor executing the POSTAGEMAKER software through communication means such as computer network 105 or PSN 102 or 122 illustrated in FIG. 1C if desired. For example, referring to FIG. 15, refilling of postage storage device 18 coupled to system 20 may be accomplished by the E-STAMP program operating on system 10 establishing communication with the POSTAGEMAKER program operating on system 1500 through PSN 102. Thereafter, POSTAGEMAKER may refill postage storage device 18, functioning substantially as described above, through remote communication rather than coupling directly to the host computer.

System 1500 includes chassis 1511 enclosing CPU 1512 and disk drive 1514. Coupled to CPU 1512 is display 1513, keyboard 1515, and mouse 1516. System 1500 also includes modem 1501 for communication through PSN 102, printer/label maker 1519 and scale 1503. Additionally, system 1500 is adapted for coupling with postage storage device 1518, such as the preferred embodiment portable processor button 182 illustrated in FIG. 1B and shown in block diagram form in FIG. 11. Postage storage device 1518 is coupled to processor-based system 1500 through a postage storage device receptor 1517.

Of course, communication between postage storage device 18 and the POSTAGEMAKER program operating on system 1500 may be established through modem 121 of system 20 rather than modem 101 of system 10, if desired. Similarly, remote refilling of postage storage device 18 may be accomplished through the use of a single system, such as system 20, in communication with the system executing the POSTAGEMAKER program. It shall be appreciated that the communication system comprising modems 101, 1501 and PSN 102 of systems 10 and 1500, as well as computer network 105 and receptor 17 comprise the communication bus providing information communication between system 1500 and the postage storage device.

Alternatively, remote refilling of the postage storage device may be accomplished through the use of a LAN or Internet communication between the POSTAGEMAKER program and the postage storage device. However, it shall be understood that although the E-STAMP program may be utilized to establish remote communication with the POSTAGEMAKER program, in the preferred embodiment refilling of the postage storage device is accomplished by commands sent to the portable processor button by the POSTAGEMAKER program. Of course, where system 10 remains a part of the communication bus between system 1500 and the postage storage device, such commands must pass through system 10. The commands may be handed blindly to the postage storage device by the E-STAMP program operating on system 10, or may actually be received and interpreted. Where the E-STAMP program is not blindly passing such commands, the POSTAGEMAKER commands operate to enable the E-STAMP program to cause the postage storage device to be replenished.

Because remote refilling of the postage storage device does not require its physical transportation, the replenishment of postage credit stored within may be easily automated to result in its automatic occurrence upon a condition or event. Of course, remote refilling also may be instigated at the command of a user of the E-STAMP program, if desired. Furthermore, refilling, automatic or otherwise, may advantageously occur in the form of either the POSTAGEMAKER program or the E-STAMP program establishing communication to accomplish replenishing of the postage storage device.

For example, upon automatic determination that the value of credit maintained within a coupled postage storage device is below a predetermined value, the E-STAMP program may automatically cause a coupled modem to go off hook and initiate communication with a POSTAGEMAKER program. It shall be appreciated that information necessary to establish communication with the POSTAGEMAKER program may be stored within the postage storage device or may be input and/or stored within the E-STAMP program, such as, for example, at the time of registration. The predetermined value at which the E-STAMP program so reacts may be established by the user of the E-STAMP program, may be stored within the postage storage device, or may be a value determined by the postal authority below which the credit should not be allowed to fall.

Similar to the E-STAMP program, the POSTAGEMAKER program may initiate the communication with the postage storage device. Occurrences which may be advantageous in causing the POSTAGEMAKER program to initiate communication include the passing of a predetermined amount of time since the last refill of a particular postage storage device. This communication may be utilized not only to refill the postage storage device, but may be utilized poll registers or data stored within the postage storage device to determine if unauthorized use or refilling has occurred.

Figure 4:
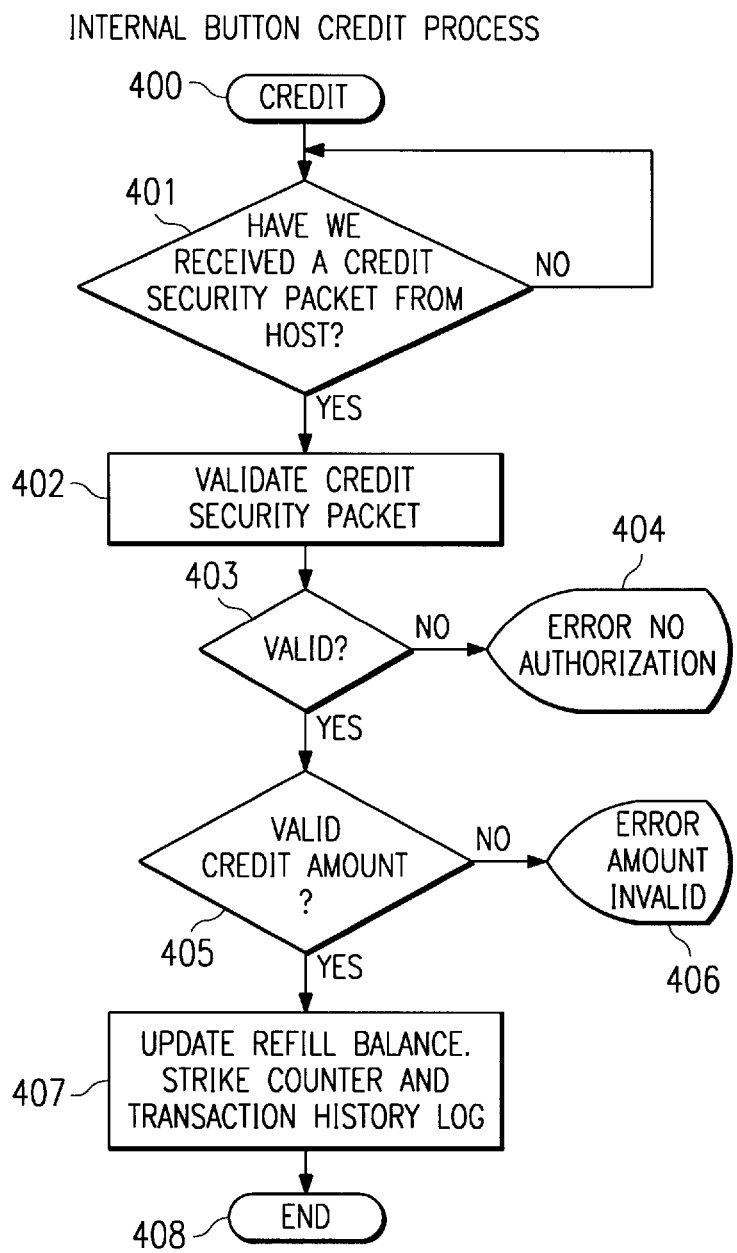
FIGS. 4 and 5 illustrate flow diagrams of the replenishing and debiting processes.

Regardless of the method by which refilling is to take place, remotely or physically coupled to the POSTAGEMAKER system, FIG. 4, which begins with step 400, depicts the credit process within the postage storage device. Box 401 reviews the material received from the host to determine validity looping back to box 401 if no security packet is received. Boxes 402–404 validate the security packet generating an error at box 404 if no valid in box 403, otherwise proceeding to box 405. Boxes 405–406 validate the valid credit amount generating an error at box 406 if the credit amount is not valid, otherwise proceeding where box 407 updates the internal memory. Box 408 ends the routine.

POSTAGE DEBITING AND INDICIA PRINTING

Figure 5:
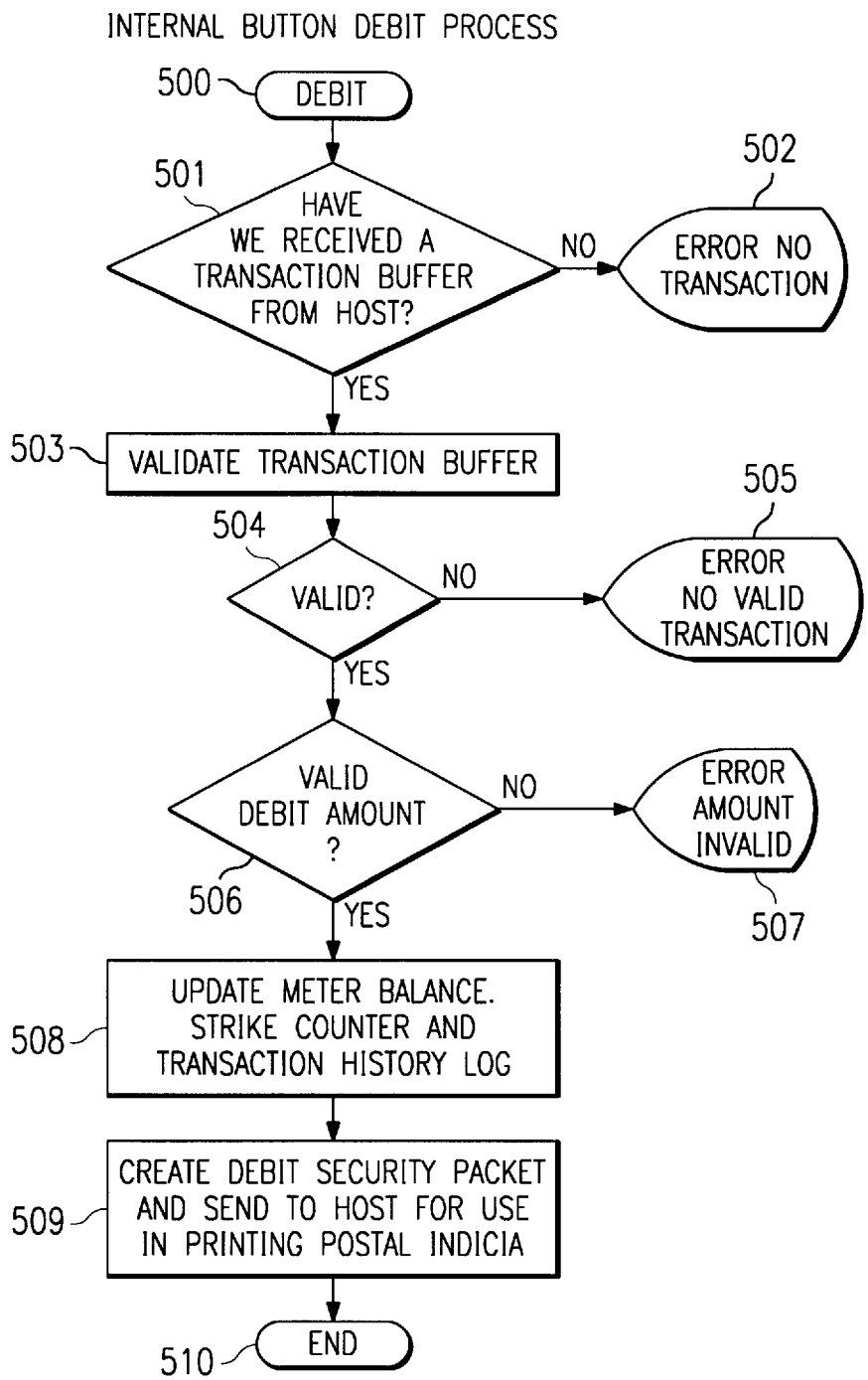

FIG. 5 shows the button Debit Process which begins with box 500. For boxes 501–505 a transaction buffer request from the host is checked generating an error at box 502 if no transaction buffer request is received at box 501, otherwise proceeding to box 503 and 504 to validate the request. If the transaction buffer request is not valid in box 504 an error is generated at box 505, otherwise proceeding to box 506. In boxes 506–507 the validity of debit amounts on the bus are checked if the debit amount is not valid an error is generated at box 507, otherwise proceeding to the box 508. Box 508 updates the internal registers of the button and box 509 creates the security packet for transmission to the host. Box 510 ends the routine.

Figure 6:
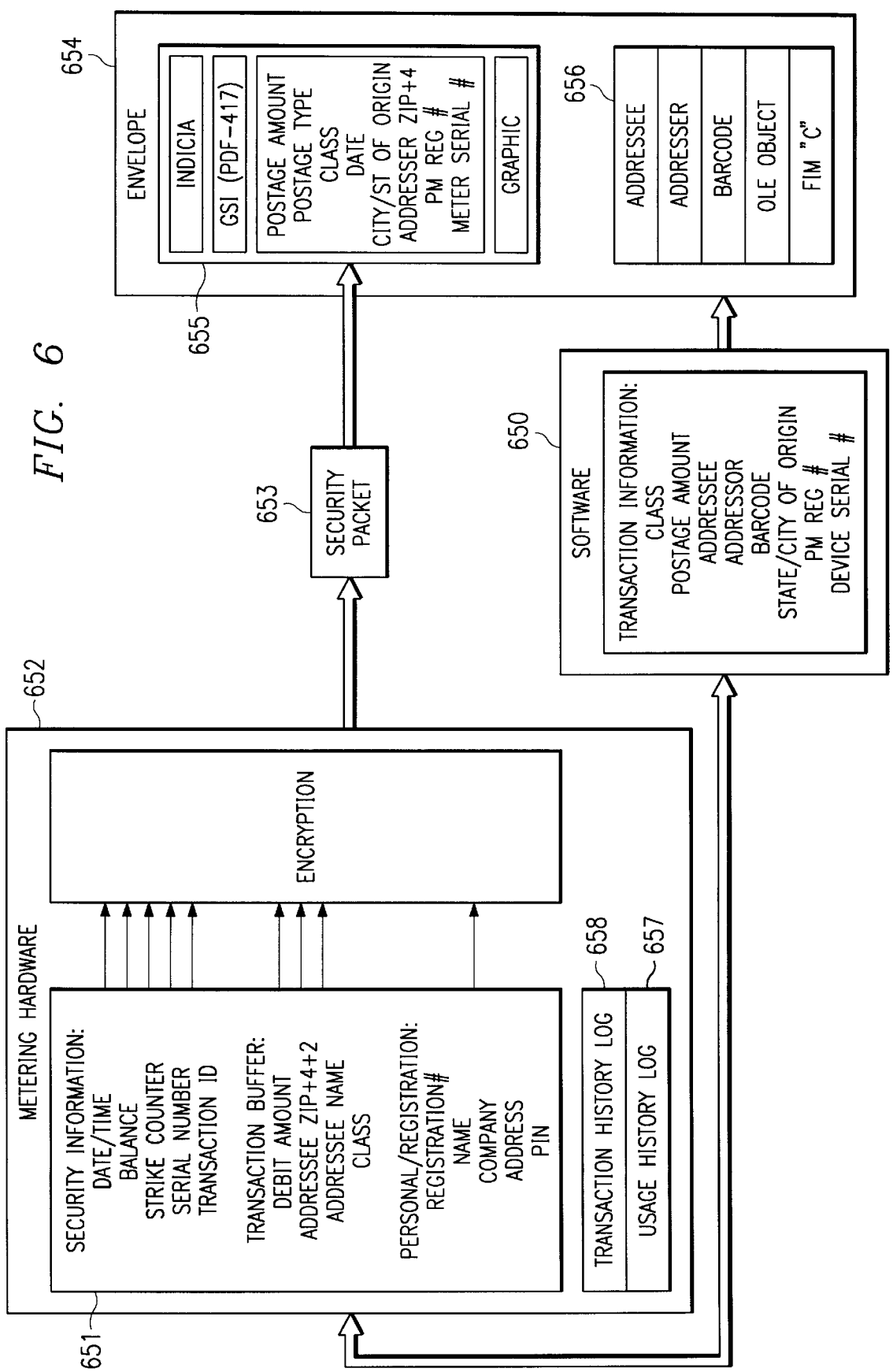
FIG. 6 illustrates a preferred embodiment of the security techniques utilized within the present invention.

Referring to FIG. 6 there is illustrated a preferred embodiment of the transformation of user information by the portable processor button into a data entity known as a security packet which is then handed off to the E-STAMP application, running in a processor-based system and transformed into an indicia for inclusion on an envelope.

The process begins in Box 650 in the software, running in the processor-based system, when a user fills out an envelope and demands of the program that it be printed with an indicia of x amount of postage determined by weight, zone, etc., as shown in boxes 654, 655 and 656. Much of the information to be printed on the envelope will be transferred to the internal software printing functions which interact through interfaces with the "Windows" operating system by methods well known in the art.

In addition and before this hand-off of information is accomplished, in Step 651, the program sends a command to the portable processor button 18 (FIG. 1A) to create a data entity or form known as a security packet. Included with the command is the data that will produce the envelope which includes, but is not limited to, date and time, current balance of metering device, strike counter of total transactions, serial number of meter, transaction id, debit amount, addressee ZIP code, addressee name and class of postage. There is also a complement of information about the user: registration id, name, company and address. Included for secure access to the button is the personal identification number (PIN) which is the password used to unlock the button and is validated within the secure environment of the button.

Once the PIN is validated, the secure processor 18 accepts all of this data from the host process-based system and in Step 652, using internal math co-processor hardware, encryption software algorithms and encryption keys, the portable processor produces the security packet using information from Boxes 657 and 658. The encryption algorithms can advantageously be RSA public/private key but might be changed at any time related to security issues. Indeed, this security packet, produced in the secret and secure environment of the portable processor becomes indecipherable to the outside world including the processor-based system. The only other entity which should have knowledge of the keys to be able to decrypt this packet would be the postal authority in their designated mail sorting and scanning centers.

In Step 653, the security packet is transmitted back as a response to the host processor-based system. This indecipherable security packet is then handled blindly by the program to the point where it is passed on to a software function within the program which will encode security packet 653 into a bar code image. The program then takes this bar code image, includes certain other unencrypted information for the visual identification of the postage indicia and passes this through the programmer's interface to the "Windows" system to the standard printing facilities of that environment in a fashion well known in the art. Also included in this step is the passing of the return and designation addresses and all other parts of the envelope or other document which must be printed and can vary based on user choices before the printing step.

These "Windows" printer drivers, supplied with the "Windows" system and apart from the E-Stamp system, can change for any given printer installed, isolating an application program such as E-STAMP from the innate differences of these printers in a fashion known as "device independence" also well known in the art. The driver, in Steps 655 and 656, does its work of printing on the envelope, 654, which has already been inserted in the printer.

POSTAGE STORAGE DEVICE INITIALIZATION CONTROL

The POSTAGE button initialization operation for new (never used buttons) is shown in FIG. 10D beginning at STEP 1040. The initialization command must first verify, in step 1041, its authority level is correct and set at one by the presence of valid and password-unlocked master and agent buttons looping back the step 1041 if not. Provided this is the case, in step 1042, the initialization function must locate a "blank" button on the bus to proceed to step 1043, otherwise looping back to step 1041. A blank button is defined as one which has pre-loaded operating instructions in its internal read-only-memory which are specific to the E-Stamp/Postal authority application outlined in this patent. The operating instructions must also be of the type of button being initialized. That is, those instructions for a POSTAGE button are somewhat different than those for a SECURITY DEVICE button necessitated by the differences in their operating behaviors and functions.

When a button, POSTAGE or SECURITY DEVICE type, receives an initialization command from system 10, it must first have instructions in it to tell it what initialization means and what should be performed to accomplish this. Thus, it is the button that initializes itself after receiving a command from system 10, not system 10 directly writing in memory locations within the button. The architecture of the button is such that outside influence cannot directly change its operating instructions or memory. The host system for the button can only issue commands as defined in a narrow set of criteria to the button to make it perform a task such as initialization, credit or debit operations and repair of damaged memory.

In Step 1043, the actual initialize command is issued from system 10 to button and response of completed or not must return before the time-out period as shown in step 1044 or an error is generated (Step 1045), otherwise proceeding to step 1046.

In step 1046, the positive or negative outcome are displayed on system 10 display screen to the agent. The transaction is logged and a customer receipt is printed out by POSTAGEMAKER before ending the initialization function at Step 1047.

The internal layout of data in RAM for a POSTAGE button is depicted in FIG. 12, as box 1201.

The POSTAGE button repair operation is shown in FIG. 10E beginning at step 1050. The repair command must first verify, in step 1051, its authority level is correct and set at one by the presence of valid and password-unlocked master and agent buttons to proceed to step 1052, otherwise looping to step 1051. Provided this is the case, in step 1052, the repair function must locate a damaged, but still valid POSTAGE button on the bus to proceed to step 1053, otherwise looping to step 1051. A damaged button is defined as one which has some internal memory location(s) which have been lost or changed because of internal program errors in the POSTAGE button itself. Another type of "damage" which may need repair might result if a POSTAGE button had ever been lifted from its holder while a system 10 was issuing commands to it and the button was in the middle of executing some of those commands and the user lifted the button off of its holder. This would then immediately stop execution of the internal operating code of the button, perhaps leaving the results of the intended operation indeterminate.

A more permanent kind of damage might be the loss of internal RAM or ROM which would probably be catastrophic enough that total replacement of the button would be in order. Such replacement would necessarily dictate marking the button serial number as invalid in the E-STAMP user registration database and entering the new button serial number for that user once it has been replaced and registered.

In Step 1053, the actual Repair command is issued from system 10 to the POSTAGE button and response of completed or not must return before time-out period as shown in step 1054 to proceed to step 1056, otherwise an error is generated (step 1055). The button must act on this command by checking its internal structures insofar as it can to see if all is as it should be. If nothing seems out of order, there is no repair work to be done. Otherwise, anything that can be reinitialized will be, and in any case, the results of the operation are reported back to system 10 and displayed in Step 1056. Thereafter the postage button repair operation is ended at Step 1057.

The AGENT button initialization operation is shown in FIG. 10F beginning at step 1060. The initialization command must first verify, in step 1061, its authority level is correct and set at two by the presence of a valid and password-unlocked master button, looping to step 1061 if not. Provided this is the case, in step 1062, the agent initialization function must locate a "blank" button on the bus to proceed to step 1063, otherwise looping to step 1061. A blank button is defined as one which has pre-loaded operating instructions in its internal read only memory which are specific to the E-Stamp/Postal authority application outlined in this patent.

As explained above, the operating instructions must also be of the type of button being initialized. That is, those instructions for a POSTAGE button are somewhat different than those for a SECURITY DEVICE button necessitated by the gross differences in their operating behaviors and functions. When a button, POSTAGE or SECURITY DEVICE type, receives an initialization command from system 10, it must first have instructions in it to tell it what initialization means and what should be performed to accomplish this. Thus, as discussed above, it is the button that initializes itself after receiving a command from system 10, not system 10 directly writing in memory locations within the button. The architecture of the button is such that outside influences cannot directly change its operating instructions or memory. The host system for the button can only issue commands as defined in a narrow set of criteria to the button to make it perform a task such as initialization, credit or debit operations and repair of damaged memory.

In Step 1063, the actual Initialize command is issued from system 10 to button and response of completed or not must return before time-out period as shown in step 1064 to proceed to step 1066, otherwise an error is generated (step 1065).

In Step 1066, the positive or negative outcome is displayed on system 10 display screen to the agent. Thereafter the agent button initialized operation is ended at Step 1067. The newly formatted agent button may now be removed from its holder and distributed to its new agent owner. The internal layout of data in RAM for an agent (or master) button is depicted in FIG. 13, Referring back to FIG. 10A, and for the sake of further discussion and understanding of this POSTAGEMAKER button validation process, if a real-world situation presents itself where all three types of buttons: AGENT, MASTER and POSTAGE happen to be on the bus at the same time, the proper button is located by its response after a status query by system 10 running POSTAGEMAKER. Furthermore, the POSTAGEMAKER software has been designed in such a fashion that the button's physical position on the bus is not of importance. Once a button has been located and connected, its position on the bus could physically change with no effect to POSTAGEMAKER. This flexibility lends a certain forgiveness to order of log on of Master or Agent and distinguishing between the two and also between POSTAGE buttons and the Master or Agent.

PREFERRED EMBODIMENT—PORTABLE PROCESSOR LAYOUT

Figure 11:
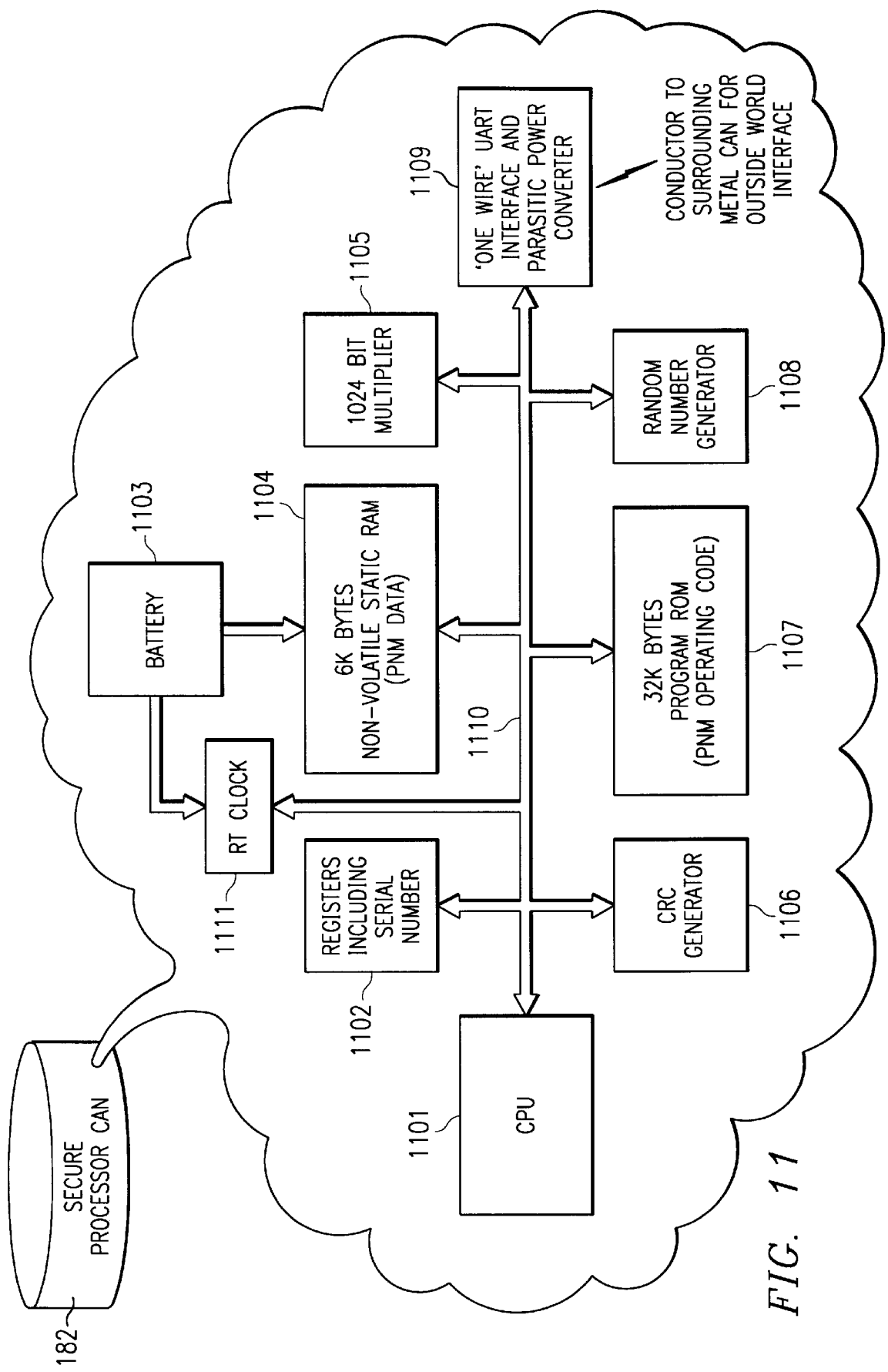
FIG. 11 illustrates the architecture for the preferred embodiment of the portable processor.

FIG. 11 depicts a functional layout of the Dallas Semiconductor "smart" button 182 which is the preferred embodiment of the portable postage dispensing device. The smart button is so called because of its button-like appearance and small size and built-in memory 1104, 1107 and processor (CPU) 1101. It is a microprocessor contained in a hermetically sealed metal can with several other "hybrid" components which make it even more useful in a secure environment.

Central processing unit (CPU) 1101 is a more efficient copy of the original 8051 microprocessor of Intel Corporation. Like most microprocessors, it executes instructions in sequence out of a memory, in this case, 32 Kbytes of read only memory (ROM) 1107. This sequence of instructions is sometimes known as a program or as operating code. Any process which has been programmed into a CPU will also require data to represent various control aspects of its task. Most of the data for the E-STAMP postage dispensing devices is kept in the 6 Kbytes of random access memory (RAM) which are non-volatile. Semiconductor RAM loses its contents once power is removed from it, thus its volatile nature. Where this unique device draws its power from will be discussed here below. However, in order to not lose the contents of the RAM between uses of the button, a small battery 1103 with a life of 10 years is present.

Included is a set of registers 1102 for various uses as discussed herein. In addition to the normal registers which are part of the 8051-like architecture of the smart button, there are several other general purpose registers which provide such features as timed access to particularly sensitive RAM locations (such as the location of a cryptographic key). Another register is used for sequence checking of the operating code of the smart button. This feature makes sure that the code is executing in the proper sequence and has not somehow jumped out of its normal path of execution because of an anomaly of electrical states or due to tampering. Another register is a real-time clock 1111 which gives the button self-sufficiency in knowing what the current time is relative to its expiration date and also as an unimpeachable (in the sense that it cannot easily be externally tampered with) source of date stamping for the postage indicia.

Several other special features have been added just for E-STAMP use. There is a 1024-bit modular exponentiator circuit 1105 which can handle two 1024-bit operands in extremely high speed. The application of this is for the cryptographic chores which are necessary in secure communications between system 10 and button 182. Another feature is random number generator 1108, also for cryptographic algorithm use. Another feature is a cyclic redundancy check (CRC) generator 1106 for use in communications to verify integrity of data received from system 10.

One feature, not specific to this system, but necessary all the same is a universal asynchronous receiver transmitter (UART) circuit 1109 for communication with the outside world. This UART makes contact with host systems via the metal case surrounding the smart button. This metal case must come in contact with an interface circuit bus which is ultimately connected to a host system via means well known in the art. The UART takes care of the task of sending and receiving bytes of information and informing the CPU of its status.

Another function of this circuit is to take "parasitic" power from the host interface. This parasitic power is the voltage and current actually used to give the CPU and other circuitry the power it needs to function at high speed without the need to draw on the internal battery for anything but keeping the contents of the RAM and the real time clock register live. Bus 1110 connects all of the internal devices together so that they can function as a unit. The manner in which the UART and parasitic power are arranged to interface with the outside world, through the metal can of the processor is unique and leads to increased usability for the entire device.

MEMORY LAYOUTS

FIG. 12 is the layout given to the 6K RAM in the preferred embodiment for a postage button. All registration identity, current balance and history logging data are stored in box 1201.

FIG. 13 is the layout given to the 6K RAM in the preferred embodiment for a security device button such as an agent or master. As can be seen by comparison with FIG. 12, the SECURITY DEVICE is a similar, but limited subset of the POSTAGE memory definitions. There is just enough data in box 1301 to identify its owner and to provide logging services in order to better know how various buttons are being used.

Figure 14:
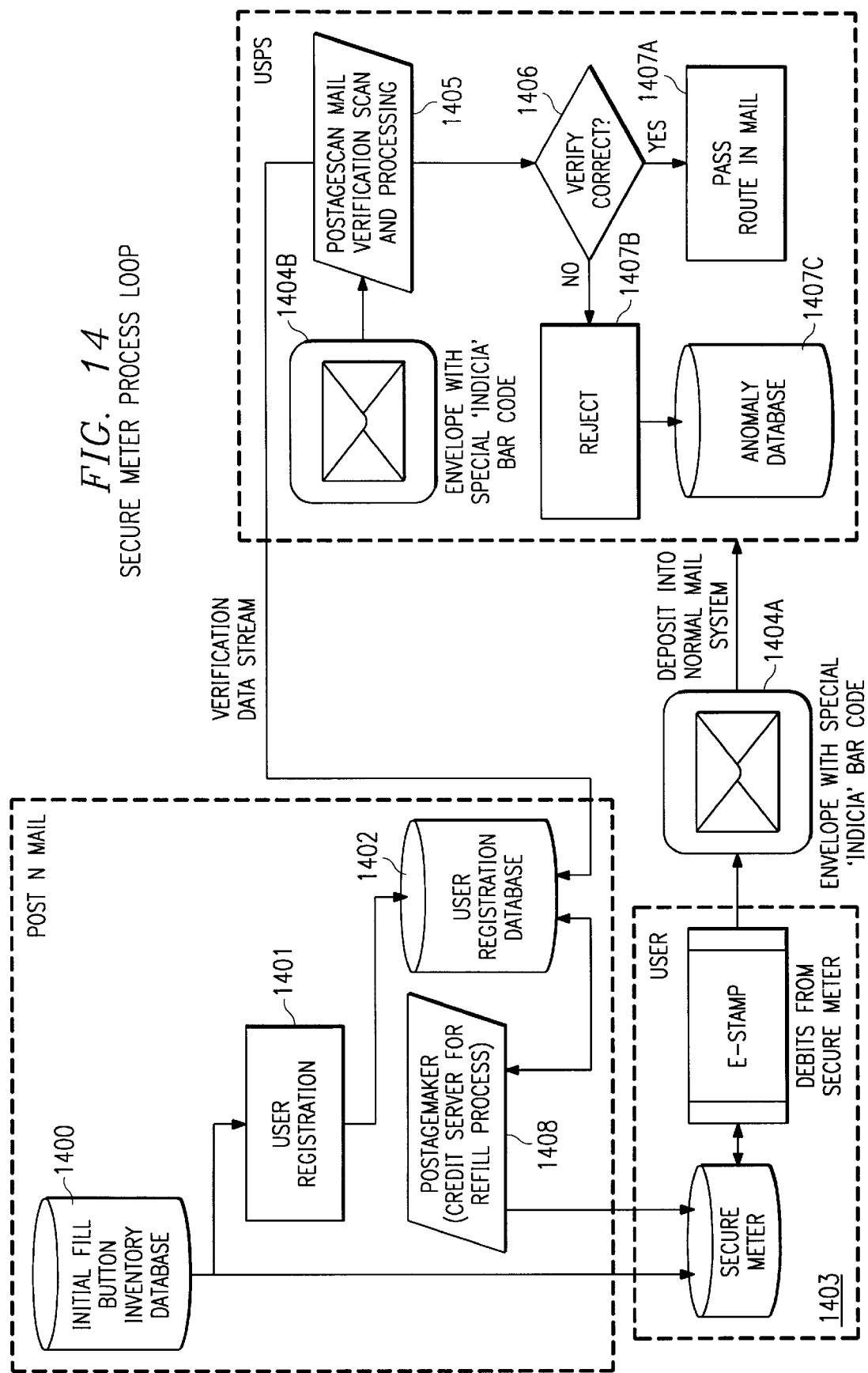
FIG. 14 shows the interrelationship of the database for registering memories assigned to users and the use of the database for verification purposes.

Referring now to FIG. 14, the process begins at Step 1400 where a button is initially created and may be given a small token value. The button creation is marked by its entry into an "Initial Fill Button Inventory Database" simultaneously with its inclusion in a shrink-wrapped package of software to be shipped to users of the verification system. Once a given software package, button included, has been obtained by a potential user, he/she must fill out an electronic user registration form whose present embodiment is that of a "Windows" program separate from the main program but included with it on the system installation disks. The registration program must be executed as part of the installation of the system before it can be used to issue postage. The process of the user filling out the form, sending it and the still-unregistered button back for registration to be scanned into the user registration database for registration is represented in Step 1401 and Step 1402. Also included in these steps is the removal of the button from the Initial Fill Button Inventory Database now that it is a valid registered postage dispensing device. In effect, the button, with its unique serial number, was moved from one inventory to another. Furthermore, as will be seen in future steps, the user registration database will be used for far more than just normal user registration of a software product.

Alternatively, the registration of the button may be accomplished remotely, utilizing communications means, such as a PSN or LAN, and methods substantially the same as in remote refilling of the button discussed above. Such remote registration would involve the communication of information as described above, but transmission of this data is accomplished by electronic means rather than the form described above. Of course, the use of the above mentioned form may be omitted even without remote registration by the storage of such information electronically, such as, for example, within the postage storage device itself or other machine readable media.

In Step 1403, the user has received back his/her button, now fully registered and therefore legal to use in postage transactions. The user inserts the secure meter (button) in its interface receptacle and invokes the system control program on the PC. Once a letter has been produced, with a certain amount of postage, this amount of postage is deducted from the amount stored in the portable processor (memory) by way of commands from the E-STAMP program. The postal indicia with its encrypted form of user information, postage amount, date, strike counter and other information is printed on a label for sticking to an envelope, actually printed on an envelope or directly on a document. At this point, the mail object is entered into the mail system of the Postal Authority in Step 1404A.

In Step 1404B, the article of mail has been gathered and sent to a central processing facility. In Step 1405, the article of mail is scanned. The scan process first decodes the postal indicia using bar code scanning technology coupled with industrial automation toward the goal of validation of the pre-paid rights to send the article of mail. The system, in Step 1406, uses a series of criteria and checks to accomplish this. Examples of criteria include, (but are not limited to): 1) Just the fact that the indicia, which was encrypted in the secure environment of the portable postage dispensing device, can be decrypted gives a basic comfort level of validation; 2) Check against the central user database for validation of expiration date, expected balance of meter as of now and special flags for lost or stolen portable postage dispensers giving the capability to invalidate them much in the same way lost or stolen credit cards can be invalidated because of their validation against a central database.

If the article of mail passes, in Step 1407A, the mail is routed to its normal destination. However, if the article of mail does not pass one of the tests, it is rejected to Step 1407B where an entry is written in an Anomaly database 1407C of items to be investigated.

The refill, Step 1408, happens asynchronously to the rest of the steps, but is included, nevertheless, because of its contribution to the overall process loop. This is performed when a user has used most of the pre-paid credit on his/her meter (portable processor) and must return the portable processor to an authorized refill station, such as the Postal Authority. The preferred embodiments may include simply a host processor-based system used by one authorized agent to serve walk-up clients or an automated process whereby postage processor buttons are refill-processed in batches with little human interaction. In either case, the user provides his/her portable processor (memory) to the authorized agent, along with prepayment in the form of check, credit card, ACH, electronic funds transfer, or private account. The portable processor is credited with the prepayment amount using a PC which is executing to accomplish this in a secured and authorized environment. Once the portable processor has been credited, it is returned to the user, who can then continue to freely use the system to issue postage until the next time the portable processor must be refilled with pre-paid credits.

The other important contribution of the system is its updating of the central user database with information on renewed expiration date, user pre-paid balance, refilling station identification, etc. This information is invaluable in the validation Step 1406.

As discussed above, the process loop gives the benefits of accounting and audit-ability of pre-paid electronic postage to the adopting Postal Authority.

While the invention has been shown to work in conjunction with a postal indicia system, it should be understood that the indicia is simply a printed form of a data packet produced by the cooperative effort of the PC and the portable processor. The data packet contains information that can be used for look up purposes in the database. Thus, the data packet can serve to authenticate any data stream coming from the PC or can be to authenticate itself, thereby granting a user certain privileges, based upon the authentication. For example, the data packet could be associated with airline tickets, either in printed form or in electronic form. In either event, the data packet associated with the document to be checked is authenticated to prove the authenticity of the accompanying data. As noted, the "other" data can be printed (the data packet would then be printed and scanned into the system) or the "other" data could be electronic (the data packet could then be electronic and read directly).

Although the invention has been discussed with reference to the United States Post Office, it shall be understood that it may be advantageously utilized in conjunction with any number of other postal authorities such as official postal authorities of foreign countries or private parcel carriers. Furthermore, the present invention may also be utilized where the electronic transfer of monetary indicia is advantageous without being limited to the transmission of postal items.

The aforementioned E-STAMP and POSTAGEMAKER programs have been shown and described with respect to a "Windows" operating environment on a PC. Of course, other means could be employed for implementing the present invention within a host processor-based system.

Although the present invention and its advantages have been described in detail, it should be understood that various changes, substitutions and alterations can be made herein without departing from the spirit and scope of the invention as defined by the appended claims.

What is claimed is:

1. A closed metering system for transferring a value from a portable processor device having representative value stored therein coupled to a first processor-based subsystem to selected ones of a plurality of affiliated individual processor-based subsystems via a communication link coupling said first subsystem and said selected affiliated subsystem, said closed metering system comprising:

a second processor-based subsystem, the first subsystem and second subsystem being ones of the plurality of affiliated subsystems, wherein at least one of the first and second processor-based subsystems is operable to perform non-metering functions;

means, executing at least in part on the second subsystem, for transferring a predetermined amount of said representative value from the portable processor via the communication link to said second subsystem; and means for printing an indicia having value in the predetermined amount of said representative value.

2. The system set forth in claim 1, wherein the transferring means also executes at least in part on the first subsystem.

3. The system set forth in claim 1, wherein the transferred representative value comprises data indicating the indicia to be printed by the second subsystem.

4. The system set forth in claim 1, wherein the transferred representative value comprises data indicating a particular value from the portable processor.

5. The system set forth in claim 1, further comprising:

means for decrementing the representative value from the portable processor under control of the first subsystem operating on instructions from the second subsystem.

6. The system set forth in claim 1, further comprising:
means, under control of a subsystem of said affiliated subsystems, for maintaining a transaction log, said transaction log recording information associated with said representative value stored in said portable processor.

7. The system set forth in claim 1, further comprising:
means, under control of the first subsystem, for queuing requests from other ones of the affiliated subsystems, the requests being communicated via the communication link, the requests seeking transfer of individual predetermined amounts of the representative value from the portable processor.

8. The system set forth in claim 1, wherein said first processor-based subsystem is a general purpose personal computer.

9. The system set forth in claim 1, wherein said first processor-based subsystem is a dedicated purpose network node.

10. The system set forth in claim 1, wherein said communication link comprises a local area network.

11. The system set forth in claim 1, wherein said communication link comprises a wide area network.

12. The system set forth in claim 1, wherein said communication link comprises the Internet.

13. The system set forth in claim 1, wherein said first subsystem comprises a mainframe computer subsystem coupled to said communication link.

14. The system set forth in claim 1, wherein said second subsystem comprises a mainframe computer subsystem coupled to said communication link.

15. The system set forth in claim 1, wherein the first subsystem includes a printer dedicated thereto, and wherein the printing occurs on the dedicated printer controlled in part by the first subsystem.

16. The system set forth in claim 1, wherein the second subsystem includes at least one printer accessible therefrom and wherein the printing occurs on a printer selected by the second subsystem.

17. The system set forth in claim 16, wherein the printing occurs on a printer selected by the second subsystem but entirely under control of the first subsystem.

18. The system set forth in claim 1, wherein said printing means comprises:
means for integrating said indicia into a document to be printed bearing said indicia, said document being initially generated by a process operable at least in part on the second subsystem.

19. The system set forth in claim 18, wherein said process is selected from the group consisting of a word processor program, a spreadsheet program, a database program, an accounting program, and a graphics program.

20. The system set forth in claim 1, further comprising means for replenishing said representative value stored within said portable processor device, said replenishing means being operable to increment said representative value upon a command from a third processor-based subsystem in information communication with at least one of said first and second subsystems.

21. The system set forth in claim 20, wherein said third subsystem is external to said closed metering system.

22. The system set forth in claim 21, wherein said replenishing means operates at least in part on each of said first, second, and third subsystems.

23. The system set forth in claim 20, wherein said replenishing means is operable automatically upon occurrence of a predetermined condition of said portable processor device.

24. The system set forth in claim 23, wherein said condition comprises a determination that said representative value stored within said portable processor is less than a predetermined value.

25. A computer program product having a computer readable medium on which computer readable logic is recorded for distributing postage indicia within a private system, said computer program product comprising:
means for providing information communication through a host processor-based system between a plurality of processor-based subsystems and a portable processor having a postage credit stored therein coupled to the host processor-based subsystem, said private subsystem comprising the plurality of processor-based subsystems and the host subsystem; and
means, executing at least in part on a particular subsystem of the plurality of subsystems, for obtaining a predetermined amount of the postage credit from said portable processor by the particular subsystem.

26. The computer program product of claim 25, wherein the obtaining means executes at least in part on the host subsystem.

27. The computer program product of claim 25, wherein said obtaining means comprises:
a client module for generating a request for said predetermined amount of said postage credit, said client module also for processing a response to said generated request; and
a server module for processing said request for said predetermined amount of said postage credit, said server module also for removing said predetermined amount of said postage credit from said portable processor, said server module also for generating a response to said request, said generated response including said predetermined amount of said postage credit.

28. The computer program product of claim 25, wherein the generated response comprises data representative of a postage indicia.

29. The computer program product of claim 25, wherein the generated response comprises data representative of a particular value from the portable processor.

30. The computer program product of claim 25, wherein said client module is independently executable from said server module.

31. The computer program product of claim 25, wherein said client module executes on at least one subsystem of the plurality of subsystems and said server module executes on the host subsystem.

32. The computer program product of claim 25, further comprising:
means, under control of said server module, for maintaining a transaction log, said transaction log recording information associated with said information communication between said server module and said client module.

33. The computer program product of claim 25, further comprising:
means, under control of said server module, for queuing the information communication between said server module and multiple ones of said client module.

34. The computer program product of claim 25, further comprising means for refilling said postage credit stored in said portable processor, said refilling means operable at least in part on a processor-based system external to said private system, said external processor-based system being in temporary information communication with at least one subsystem of said plurality of subsystems.

35. The computer program product of claim 34, wherein said refilling means is activated without user intervention upon a predetermined event.

36. The computer program product of claim 35 wherein said event comprises a determination that said postage credit stored in said portable processor is below a predetermined threshold.

37. The computer program product of claim 25, further comprising:
   means, under control of the particular subsystem, for printing a postage indicia having a value recognized by a postal authority, the value of the postage indicia being a function of the predetermined amount of the postage credit obtained by the particular subsystem.

38. The computer program product of claim 37, wherein said printing means comprises:
   means for integrating said postage indicia into a document to be printed bearing said indicia, said document being initially generated by a computer program operable on said private subsystem.

39. The system set forth in claim 38, wherein said computer program is selected from the group consisting of a word processor program, a spreadsheet program, a database program, an accounting program, and a graphics program.

40. A method for transferring a pecuniary value from a portable memory device coupled to a first general purpose processor-based system to a second general purpose processor-based system via a communication link, said first system and said second system being affiliated, wherein at least one of said first and second general purpose processor-based systems performs functions unrelated to the transfer and printing of the pecuniary value, said method comprising the steps of:
   temporarily coupling a portable memory device to said first processor-based system, said portable memory having stored therein said pecuniary value;
   obtaining, by said second processor-based system, via said communication link said pecuniary value from said portable memory; and
   printing, by said second system, an indicia having said pecuniary value.

41. The method set forth in claim 40, further comprising the step of:
   maintaining a transaction log, said transaction log recording information associated with said pecuniary value.

42. The method set forth in claim 40, wherein said obtaining step further comprises the step of:
   queuing information communication between said first system and a plurality of processor-based systems, the information communication comprising requests by ones of the plurality of systems for pecuniary value from said portable memory.

43. The method set forth in claim 40, wherein said printing step comprises the step of:
   integrating said indicia into a document to be printed bearing said indicia, said document being initially generated by a process operable at least in part on the second system.

44. The method set forth in claim 43, wherein said process is selected from the group consisting of a word processor program, a spreadsheet program, a database program, an accounting program, and a graphics program.

45. A metering system comprising:
   a plurality of processor-based systems each having a capability of controlling printing of an indicia of value on a document;
   a network node in information communication with the processor systems via an information communication network;
   a refreshable memory device for dispensing monetary equivalent value coupled to the node;
   means, controlled by each of the processor systems, for requesting a predetermined amount of the monetary equivalent value from the node;
   means for the node decrementing the requested amount of monetary equivalent value from the memory device; and
   means for communicating the decremented amount of monetary equivalent value from the node to a requesting one of the processor systems for printing of the indicia of value on a document.

46. The system set forth in claim 45, wherein the communicating means comprises the transmission of a data image of the indicia of value, the data image being of a format suitable for printing by the requesting one of the processor systems.

47. The system set forth in claim 45, wherein the communicating means comprises the transmission of a data representation of the requested amount of monetary equivalent value, the data representation being suitable for generation of the indicia of value by the requesting one of the processor systems.

48. The system set forth in claim 45, further comprising:
   means, under control of the node, for maintaining a transaction log, said transaction log comprising information associated with decrementing the requested amount of monetary equivalent value from the memory device.

49. The metering system set forth in claim 45, further comprising means, controlled at least in part by one processor system of the number of processor systems, for automatically refreshing said memory device.

50. The metering system set forth in claim 49, wherein said refreshing means comprises information communication with an administrative processor-based system authorized to refresh memory devices.

51. The metering system set forth in claim 49, wherein said automatic refreshing means operates upon said monetary equivalent value being decremented below a predetermined value.

52. A system for transferring a value to a portable processor device having representative value stored therein coupled to a first processor-based subsystem from a second processor-based subsystem via a communication link, said system comprising:
   means, executing at least in part on the first subsystem, for establishing said communication link between said portable processor and said second system, wherein said first system comprises a plurality of processor-based systems in information communication with said portable processor, said communication link established by said means providing information communication from said second system to said portable processor only through said first system; and
   means, executing at least in part on the second subsystem, for transferring a predetermined amount of said value to the portable processor from said second subsystem via the communication link.

53. The system set forth in claim 52, wherein said plurality of systems comprise a LAN.

54. The system set forth in claim 52, wherein said establishing means operates on at least two processor-based systems of said plurality of processor-based systems.

55. The system set forth in claim 52, wherein said communication link is established upon command of a user of said first subsystem.

56. The system set forth in claim 52, wherein said communication link is established upon detection of information communication originating at said second system directed toward said first system.

57. The system set forth in claim 52, wherein the transferred predetermined amount of value comprises encrypted data decipherable by said portable processor device.

58. The system set forth in claim 52, further comprising:
   means, under control of said second subsystem, for maintaining a transaction log, said transaction log recording information associated with said transfer of said predetermined amount of said value to said portable processor.

59. The system set forth in claim 52, further comprising:
   means, under control of said portable processor, for maintaining a transaction log, said transaction log recording information associated with said transfer of said predetermined amount of said value to said portable processor.

60. The system set forth in claim 52, wherein said communication link comprises a local area network.

61. The system set forth in claim 52, wherein said communication link comprises a wide area network.

62. The system set forth in claim 52, wherein said communication link comprises the Internet.

63. The system set forth in claim 52, wherein said communication link comprises a public switched network.

64. The system set forth in claim 52, further comprising:
   means, executing at least in part on the first subsystem, for communicating to said second system information indicating said predetermined amount of said value to transfer from said second subsystem to said portable processor.

65. The system set forth in claim 64, wherein said communicating means comprises:
   means for indicating a method of payment for said predetermined amount of value.

66. The system set forth in claim 52, wherein at least two processor-based systems of said plurality of processor-based systems operate to execute a portion of said transferring means.

67. The system set forth in claim 66, wherein the first subsystem blindly passes said predetermined amount of said value from said second system to said portable processor device.

68. The system set forth in claim 66, wherein the first subsystem operates to replenish said value stored within said portable processor device upon a command received in said information communication from said second system.

69. The system set forth in claim 52, wherein said communication link is established automatically upon occurrence of a predetermined condition at said portable processor device.

70. The system set forth in claim 69, wherein said second system determines the existence of said condition and causes said communication link to be established.

71. The system set forth in claim 69, wherein said first system determines the existence of said condition and causes said communication link to be established.

72. The system set forth in claim 71, wherein said condition comprises a determination that said value stored within said portable processor is less than a predetermined value.

73. The system set forth in claim 71, wherein said condition comprises a determination that a time elapsed since a time at which said representative value stored within said portable processor device was last replenished has exceeded a predetermined amount.

74. A method for transferring monetary equivalent value to a portable processor device having monetary equivalent value stored therein coupled to a first processor-based system from a second processor-based system via an information communication network, said method comprising the steps of:
   coupling a refreshable memory device for storing monetary equivalent value to said first system, wherein said first system is coupled to a plurality of associated processor-based systems forming a network system;
   establishing information communication between said first system and said second system via an information communication link;
   said first system requesting a predetermined amount of the monetary equivalent value from the second system;
   transferring said predetermined amount of monetary equivalent value from the second system to the refreshable memory device coupled to said first system via said communication link, said predetermined amount of monetary equivalent value being passed blindly by said first system from said second system to said refreshable memory device; and
   storing the transferred amount of monetary equivalent value within a register of said refreshable memory device.

75. The method set forth in claim 74, wherein said requesting step comprises the substep of:
   indicating a method of payment for said predetermined amount of monetary equivalent value.

76. The method set forth in claim 74, wherein said communication link comprises information communication means selected from the group consisting of a local area network, a wide area network, a public switched network, and the Internet.

77. A method for transferring monetary equivalent value from a portable processor device having monetary equivalent value stored therein coupled to a network node to a plurality of processor-based systems via an information communication network, said method comprising the steps of:
   coupling a refreshable memory device for dispensing monetary equivalent value to a network node;
   establishing information communication between the node and a select one of a plurality of processor-based systems via an information communication network;
   the select one of the plurality of systems requesting a predetermined amount of the monetary equivalent value from the node;
   the node decrementing the requested amount of monetary equivalent value from the memory device;
   communicating the decremented amount of monetary equivalent value from the node to the select one of the plurality of systems; and
   the select one of the plurality of processor-based systems printing an indicia of value on a document, the indicia of value having the decremented amount of monetary equivalent value.

78. The method of claim 77, further comprising the step of:

maintaining a transaction log, the transaction log comprising information associated with decrementing the requested amount of monetary equivalent value from the memory device.

79. The method of claim 77, further comprising the step of:

queuing requests from multiple ones of the plurality of systems.

80. A network node apparatus for transferring a monetary equivalent value from a portable processor device having monetary equivalent value stored therein coupled to the network node apparatus to a plurality of network nodes via an information communication network, said network node apparatus comprising:

a processor-based system in information communication with a plurality of network nodes via an information communication network;

a refreshable memory device for dispensing monetary equivalent value coupled to the processor-based system;

means for a selected one of the plurality of nodes requesting a predetermined amount of the monetary equivalent value from the processor-based system, the requesting means also being suitable for receiving the requested amount of monetary equivalent value;

means, executable on the processor-based system, for removing the requested amount of monetary equivalent value from the memory device; and means for communicating the removed amount of monetary equivalent value from the processor-based system to the requesting means.

81. The apparatus set forth in claim 80, wherein the requesting means further comprises:

means for printing the requested amount of monetary equivalent value as an indicia by the requesting one of the plurality of nodes.

82. The apparatus set forth in claim 81, wherein the communicated monetary equivalent value comprises data representative of at least part of the indicia to be printed by the requesting one of the plurality of nodes.

83. The apparatus set forth in claim 81, wherein the communicated monetary equivalent value comprises data representative of a particular value from the portable processor.

84. The apparatus set forth in claim 81, further comprising:

means, under control of said processor system, for maintaining a transaction log recording information associated with said requested monetary equivalent value.

85. The apparatus set forth in claim 81, further comprising:

means, under control of said processor system, for queuing requests from multiple ones of the plurality of nodes.

86. A postage metering system for distributing and printing postage credit contained in a portable processor device through a private processor-based network system, said postage metering system comprising:

a private processor-based network system, said network system comprising a plurality of general purpose computer systems in information communication with each other, said private system restricting information communication from processor-based systems not part of said plurality of systems;

a portable processor device containing postage credit authorized by a postal agency;

a host general purpose computer system of said plurality of systems for removably coupling the portable processor device thereto;

means, executing on any particular one of the general purpose computer systems of said plurality of systems and jointly with the host system, for obtaining a portion of the postage credit contained within the portable processor device by the particular systems;

means for queuing multiple ones of said plurality of systems seeking to obtain a portion of the postage credit contained within the portable processor device by the obtaining means; and means for printing a postage indicia representing the obtained postage credit at a location controlled by the one particular general purpose computer.

87. The system set forth in claim 86, further comprising:

means, under control of the host system, for maintaining a transaction log, said transaction log recording information associated with said postage credit contained in the portable processor.

88. The system set forth in claim 86, wherein the obtained portion of the postage credit comprises an electronic image of at least part of the postage indicia to be printed.

89. The system set forth in claim 86, wherein the obtained portion of the postage credit comprises data representative of a particular value from the portable processor.

90. The system set forth in claim 86, wherein the printing means is at least in part controlled by the host system.

91. The system set forth in claim 86, wherein the printing means is at least in part controlled by the particular one system obtaining a portion of the postage credit.

92. The system set forth in claim 86, further comprising:

means for automatically replenishing the postage credit contained in said portable processor device when a computer system of said plurality of computer systems determines said postage credit should be replenished, said replenishing means establishing communication with an administrative computer system upon said determination.

\* \* \* \* \*